US012341718B2

(12) United States Patent
Chen et al.

(10) Patent No.: US 12,341,718 B2
(45) Date of Patent: Jun. 24, 2025

(54) DYNAMIC SOUNDING REFERENCE SIGNAL (SRS) RESOURCE ALLOCATION

(71) Applicant: QUALCOMM Incorporated, San Diego, CA (US)

(72) Inventors: Bo Chen, Beijing (CN); Sony Akkarakaran, Poway, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 17/904,245

(22) PCT Filed: Mar. 12, 2020

(86) PCT No.: PCT/CN2020/078995
§ 371 (c)(1),
(2) Date: Aug. 15, 2022

(87) PCT Pub. No.: WO2021/179248
PCT Pub. Date: Sep. 16, 2021

(65) Prior Publication Data
US 2023/0105787 A1 Apr. 6, 2023

(51) Int. Cl.
*H04L 5/00* (2006.01)
*H04B 7/0404* (2017.01)

(52) U.S. Cl.
CPC ........ *H04L 5/0048* (2013.01); *H04B 7/0404* (2013.01)

(58) Field of Classification Search
None
See application file for complete search history.

(56) References Cited

U.S. PATENT DOCUMENTS

2011/0002415 A1* 1/2011 Nakao ................... H04L 1/0027
375/296
2013/0265962 A1* 10/2013 Ouchi ................... H04W 72/20
370/329
(Continued)

FOREIGN PATENT DOCUMENTS

CN 110167168 A 8/2019
CN 110168947 A 8/2019
(Continued)

OTHER PUBLICATIONS

NTT DOCOMO Inc: "Full Tx Power UL Transmission", 3GPP TSG RAN WG1 #98, R1-1909203, 3rd Generation Partnership Project, Mobile Competence Centre, 650, Route Des Lucioles, F-06921 Sophia-Antipolis Cedex France, vol. RAN WG1, No. Prague, CZ, Aug. 26-Aug. 30, 2019, Aug. 17, 2019, XP051765808, 9 pages, sections 2.1 and 2.2 and appendix, figure 1.
(Continued)

*Primary Examiner* — Hassan A Phillips
*Assistant Examiner* — Gautam Sharma
(74) *Attorney, Agent, or Firm* — Haynes and Boone, LLP

(57) ABSTRACT

Wireless communications systems and methods related to dynamic sounding reference signal (SRS) resource allocation for channel sounding are provided. A base station (BS) determines a plurality of sounding reference signal (SRS) resources for at least a first user equipment (UE), where a first SRS resource of the plurality of SRS resources includes a different quantity of SRS ports than a second SRS resource of the plurality of SRS resources. The BS transmits, to the first UE, a configuration indicating the plurality of SRS resources.

34 Claims, 10 Drawing Sheets

(56) References Cited

U.S. PATENT DOCUMENTS

| | | | | |
|---|---|---|---|---|
| 2013/0322280 A1* | 12/2013 | Pi | ................... | H04W 56/0005 370/252 |
| 2015/0009951 A1* | 1/2015 | Josiam | ................ | H04L 25/0224 370/330 |
| 2015/0223231 A1* | 8/2015 | Noh | ......................... | H04L 1/00 370/329 |
| 2018/0183503 A1* | 6/2018 | Rahman | ................ | H04B 7/0486 |
| 2019/0052424 A1 | 2/2019 | Manolakos et al. | | |
| 2019/0081751 A1* | 3/2019 | Miao | ................... | H04L 25/0224 |
| 2019/0174527 A1* | 6/2019 | Park | ...................... | H04L 5/0046 |
| 2019/0207731 A1* | 7/2019 | Park | ...................... | H04B 7/0456 |
| 2019/0274155 A1 | 9/2019 | Bhattad et al. | | |
| 2021/0352596 A1* | 11/2021 | Liu | ...................... | H04W 52/146 |
| 2023/0105787 A1* | 4/2023 | Chen | ..................... | H04L 5/0094 370/329 |

FOREIGN PATENT DOCUMENTS

| | | |
|---|---|---|
| CN | 110535508 A | 12/2019 |
| CN | 110649949 A | 1/2020 |
| WO | 2019226522 A1 | 11/2019 |

OTHER PUBLICATIONS

Supplementary European Search Report—EP20924743—Search Authority—The Hague—Nov. 8, 2023.

VIVO: "Further Discussion on Full Tx Power in UL Transmission", 3GPP TSG RAN WG1#97, R1-1906161, 3rd Generation Partnership Project, Mobile Competence Centre, 650, Route Des Lucioles, F-06921 Sophia-Antipolis Cedex, France, vol. RAN WG1, No. Reno, USA, May 13-May 17, 2019, May 3, 2019, 5 pages, XP051708202, section 2.

International Search Report and Written Opinion—PCT/CN2020/078995—ISAEPO—Dec. 14, 2020.

Nokia et al., "On The Full Tx Power UL Transmission", 3GPP TSG-RAN WG1 Meeting #97, R1-1907318, Reno, USA, May 13-17, 2019, 7 Pages, Sections 1-2.

VIVO: "Summary of [96b-NR-07] Clarification on Alternative UL Full", 3GPP TSG RAN WG1#96bis, R1-1905911, Xi'an, China, Apr. 8-12, 2019, 14 Pages, p. 5,8.

ZTE: "Maintenance of Full Power UL Transmission", 3GPP TSG RAN WG1 Meeting #100-e, R1-2000241, e-Meeting, Feb. 24-Mar. 6, 2020, 6 Pages, pp. 2-3.

\* cited by examiner

DYNAMIC SOUNDING REFERENCE SIGNAL (SRS) RESOURCE ALLOCATION

CROSS-REFERENCE TO RELATED APPLICATIONS

The present application is a 35 U.S.C. 371 National Phase entry of Patent Cooperation Treaty (PCT) Application No. PCT/CN2020/078995, filed Mar. 12, 2020, which is hereby expressly incorporated herein by reference in its entirety.

TECHNICAL FIELD

The technology described below relates generally to wireless communication systems, and more particularly to dynamic sounding reference signal (SRS) resource allocation.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices (e.g., user equipment (UE)).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum.

NR may further extend multiple-input multiple-output (MIMO) technologies into massive MIMO to achieve a high spectral efficiency and a high throughput. For instance, a BS may utilize a massive number of antenna elements to spatially multiplex a large number of UEs while providing large beamforming gains. One important operation in massive MIMO is the acquisition of channel state information. Such acquisition process may rely on the use of reference signals. For instance, a BS may configure each connected UE to transmit one or more SRSs to assist the BS in determining uplink (UL) channel characteristics, for example, for UL scheduling, link adaptation, and/or UL precoder selection. In a time-division-duplexing (TDD) system with channel reciprocity, the BS may also determine downlink (DL) channel characteristics from UL SRSs, for example, for DL scheduling, link adaptation, and/or DL precoder selection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes determining, by a base station (BS), a plurality of sounding reference signal (SRS) resources for at least a first user equipment (UE), where a first SRS resource of the plurality of SRS resources includes a different quantity of SRS ports than a second SRS resource of the plurality of SRS resources; and transmitting, by the BS to the first UE, a configuration indicating the plurality of SRS resources.

In an additional aspect of the disclosure, a method of wireless communication, includes receiving, by a user equipment (UE) from a base station (BS), a configuration indicating a plurality of sounding reference signal (SRS) resources configured for the UE, where a first SRS resource of the plurality of SRS resources includes a different quantity of SRS ports than a second SRS resource of the plurality of SRS resources; and transmitting, by the UE to the BS, a first SRS transmission using one or more SRS ports within the configured plurality of SRS resources.

In an additional aspect of the disclosure, a base station (BS) includes a processor configured to determine a plurality of sounding reference signal (SRS) resources for at least a first user equipment (UE), where a first SRS resource of the plurality of SRS resources includes a different quantity of SRS ports than a second SRS resource of the plurality of SRS resources; and a transceiver configured to transmit, to the first UE, a configuration indicating the plurality of SRS resources.

In an additional aspect of the disclosure, a user equipment (UE) includes a transceiver configured to receive, from a base station (BS), a configuration indicating a plurality of sounding reference signal (SRS) resources configured for the UE, where a first SRS resource of the plurality of SRS resources includes a different quantity of SRS ports than a second SRS resource of the plurality of SRS resources; and transmit, to the BS, a first SRS transmission using one or more SRS ports within the configured plurality of SRS resources.

In an additional aspect of the disclosure, a non-transitory computer-readable medium having program code recorded thereon, the program code includes code for causing a base station (BS) to determine a plurality of sounding reference signal (SRS) resources for at least a first user equipment (UE), where a first SRS resource of the plurality of SRS resources includes a different quantity of SRS ports than a second SRS resource of the plurality of SRS resources; and code for causing the BS to transmit, to the first UE, a configuration indicating the plurality of SRS resources.

In an additional aspect of the disclosure, a non-transitory computer-readable medium having program code recorded thereon, the program code includes code for causing a user equipment (UE) to receive, from a base station (BS), a configuration indicating a plurality of sounding reference signal (SRS) resources configured for the UE, where a first SRS resource of the plurality of SRS resources includes a different quantity of SRS ports than a second SRS resource of the plurality of SRS resources; and code for causing the UE to transmit, to the BS, a first SRS transmission using one or more SRS ports within the configured plurality of SRS resources.

In an additional aspect of the disclosure, a base station (BS) includes means for determining a plurality of sounding reference signal (SRS) resources for at least a first user equipment (UE), where a first SRS resource of the plurality of SRS resources includes a different quantity of SRS ports than a second SRS resource of the plurality of SRS resources; and means for transmitting, to the first UE, a configuration indicating the plurality of SRS resources.

In an additional aspect of the disclosure, a user equipment (UE) includes means for receiving, from a base station (BS), a configuration indicating a plurality of sounding reference signal (SRS) resources configured for the UE, where a first SRS resource of the plurality of SRS resources includes a different quantity of SRS ports than a second SRS resource of the plurality of SRS resources; and means for transmitting, to the BS, a first SRS transmission using one or more SRS ports within the configured plurality of SRS resources.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
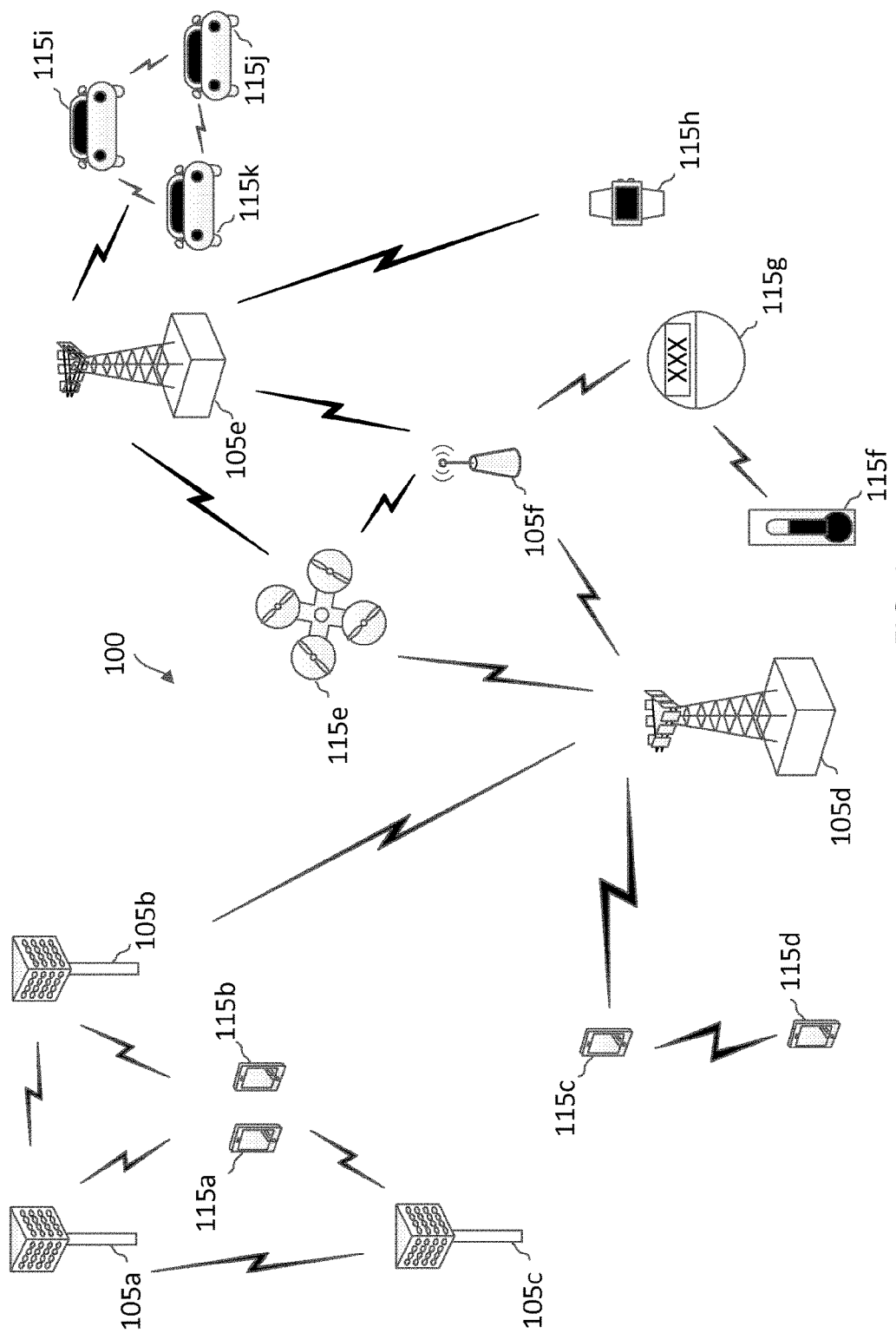
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgment in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a certain wireless communication network, a BS may configure each connected UE with one or more SRS resource sets. Each SRS resource set may include one or more SRS resources. Each SRS resource may be associated with one or more SRS ports. An SRS port may be mapped to a transmit antenna port of the UE which may be used to sound an SRS transmission and may correspond to a certain transmission layer. In 3GPP Release 15, a BS may configure a connected UE with SRS resources for SRS transmissions. The BS may configure a quantity of SRS ports for the SRS resources according to a quantity of transmit antenna ports and/or a quantity of receive antenna ports supported by the respective UE. For instance, if the UE has four transmit antenna ports and four receive antenna ports, the BS may configure the UE to transmit an SRS using four SRS ports. However, in some scenarios, it may be sufficient for the UE to sound a subset of the configured SRS ports instead of all the configured SRS ports. For example, in some instances, an SRS transmission may be used for estimations other than UL sounding. For instance, in channel reciprocity operations, an SRS can be used for DL CSI acquisition. In some other scenarios, the UE may be unable to sound all configured SRS ports concurrently, for example, due to a power limitation at the UE. When the quantity of SRS ports is exclusively provisioned for a UE based on the quantity of transmit antenna ports and/or the quantity of receive antenna ports supported by the UE, the BS may be unable to reclaim the SRS resource(s) or SRS port(s) that are not utilized by the UE for other UEs.

The present disclosure describes mechanisms for dynamic SRS resource allocation. For example, a BS may configure a pool of SRS resources for sharing among a group of UEs. The BS may configure different SRS resources in the SRS resource pool with different quantity of SRS ports. The BS may configure each UE in the group with one or more SRS resource sets each formed by one or more SRS resources from the SRS resource pool. Each SRS resource set may have a resource type of aperiodic or semi-persistent. In some aspects, the BS may determine a quantity of SRS resources for a UE based on a quantity of transmit antenna ports and/or receive antenna ports supported by the UE. For instance, if a UE supports T number of transmit antenna ports, the BS may configure the UE with at least M number of SRS resources, where T and M are positive integers and M can be less than or equal to T. Each of the M number of SRS sources may be associated with a different m number of SRS ports, where m is a positive integer and may vary from 1 to M. In some instances, the BS may configure a UE with one SRS resource for each quantity of SRS ports. For instance, if the UE supports four transmit antenna ports (e.g., T=4), the BS may configure the UE with a first SRS resource associated one SRS port, a second SRS resource with two SRS ports, a third SRS resource with three SRS ports, and a fourth SRS resource with four SRS ports. In some aspects, each UE in the group may be configured with the same SRS resources of the different quantity of SRS ports. The UEs may not utilize the SRS resources for SRS transmissions until the BS activates a specific SRS resource for a UE to transmit an SRS transmission. The activation can be via medium access control-control element (MAC-CE) signaling or downlink control information (DCI) signaling.

In some aspects, the BS may select a subset of the SRS resources for a UE to sound an SRS transmission based on a transmission rank of the UE. For instance, to activate an SRS transmission at a UE, the BS may select an SRS resource having a quantity of SRS ports matching to a transmission rank of the UE. In other words, if a UE has a transmission rank of 2, the BS may activate an SRS resource associated with two SRS ports for the UE to sound an SRS transmission even though the UE may support four transmit antenna ports. In some aspects, the UE may report a rank indicator (RI) and the BS may select and activate SRS resources for the UE based on the reported rank information.

To avoid utilizing an outdated RI report from a UE, the BS may set a certain time threshold to filter out outdated RI report. For instance, the BS may determine that an RI report is invalid if a gap duration between the time when the RI report is received by the BS and a next SRS transmit occasion of the UE is greater than a certain threshold. If the BS determines that there is no valid RI report, the BS may activate an SRS resource with a maximum number of SRS ports (e.g., equal to a quantity of transmit antenna ports at the UE).

In some instances, when there is no SRS resource with a quantity of SRS ports matching to a transmission rank of the UE available, the BS may activate the UE with an SRS resource having a quantity of SRS ports greater than the transmission rank of the UE. The UE may repeat an SRS transmission in the remaining SRS ports or mute the remaining SRS ports. For instance, the UE may have a transmission rank of R (e.g., equal to 1, 2, 3, 4, or more), but may be activated with an SRS resource having L SRS ports, where L is greater than R. The UE may transmit an SRS transmission using R SRS ports of the L SRS ports and repeat an SRS transmission in the remaining (L-R) SRS ports or remain silence in the (L-R) SRS ports.

Aspects of the present disclosure can provide several benefits. For example, the use of a common pool of SRS resources with different quantity of SRS ports for sharing among a group of UEs allows a BS to dynamically activate an SRS resource with a suitable quantity of SRS ports for a UE to sound an SRS transmission based on a current operation condition of the UE. The use of the common pool of SRS resource with different quantity of SRS ports can cater to different UEs sounding different quantity of SRS ports at different times, for example, due to varying operating conditions such as power usage and/or different number spatial or transmission layers. The selecting of an SRS resource having a suitable quantity of SRS ports for a UE to sound an SRS transmission can reduce resource wastage (e.g., reducing unused SRS ports). Accordingly, the present disclosure can support sounding with a reduced amount of SRS resources.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 may be dispersed throughout the wireless network 100, and each UE 115 may be stationary or mobile. UEs can take in a variety of forms and a range of form factors. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such asV2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. The random access procedure (or RACH procedure) may be a single or multiple step process. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. Scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may utilize massive MIMO techniques for communications. For instance, a BS 105 may have a massive number of transmit antenna elements and receive elements. The BS 105 may serve multiple UEs 115 each having one or more transmit antenna elements and/or one or more receive antenna elements. The BS 105 may multiplex multiple UEs 115 for simultaneous communications over different spatial layers. The use of massive number of transmit antenna elements and receive antenna elements may allow the BS 105 to provide a large beamforming gain while spatially multiplexing multiple UEs 115 for simultaneous transmissions and/or receptions. To assist the BS 105 in determining UL channel characteristics, the BS 105 may configure each UE 115 to sound one or more transmit antenna ports of the respective UE 115. Sounding may refer to the transmission of an SRS via one or more antenna ports. The SRS may include a predetermined waveform sequence that are known to the BS 105 and the UE 115. For instance, the SRS may be Zadoff-Chu sequence or any suitable waveform sequence. In some instances, a transmit antenna port at a UE 115 may map to a physical transmit antenna element of the UE 115. In some other instances, a transmit antenna port at a UE 115 may be a virtual antenna port or a logical port created by the UE 115, for example, via precoding. Precoding may include applying different amplitude weights and/or different phased adjustments to signals output by the physical transmit antenna elements of the UE 115 to produce a signal directed towards a certain spatial direction. In some aspects, the network 100 may operate in a TDD mode. The BS 105 may also estimate DL channel characteristics from UL SRSs received from the UEs 115 based on TDD channel reciprocity.

In some aspects, the BS 105 may configure an SRS resource pool for sharing among a group of connected UEs 115. The SRS resource pool may include a plurality of SRS resources with different quantity of SRS ports. The BS 105 may dynamically trigger or activate a subset of the plurality of SRS resources for a connected UE 115 to transmit an SRS. In some aspects, the BS 105 may activate a quantity of SRS ports for a connected UE 115 based on a transmission rank (e.g., a number of spatial layers) currently used by the UE 115. Mechanisms for dynamic SRS resource allocation and channel sounding are described in greater detail herein.

Figure 2:
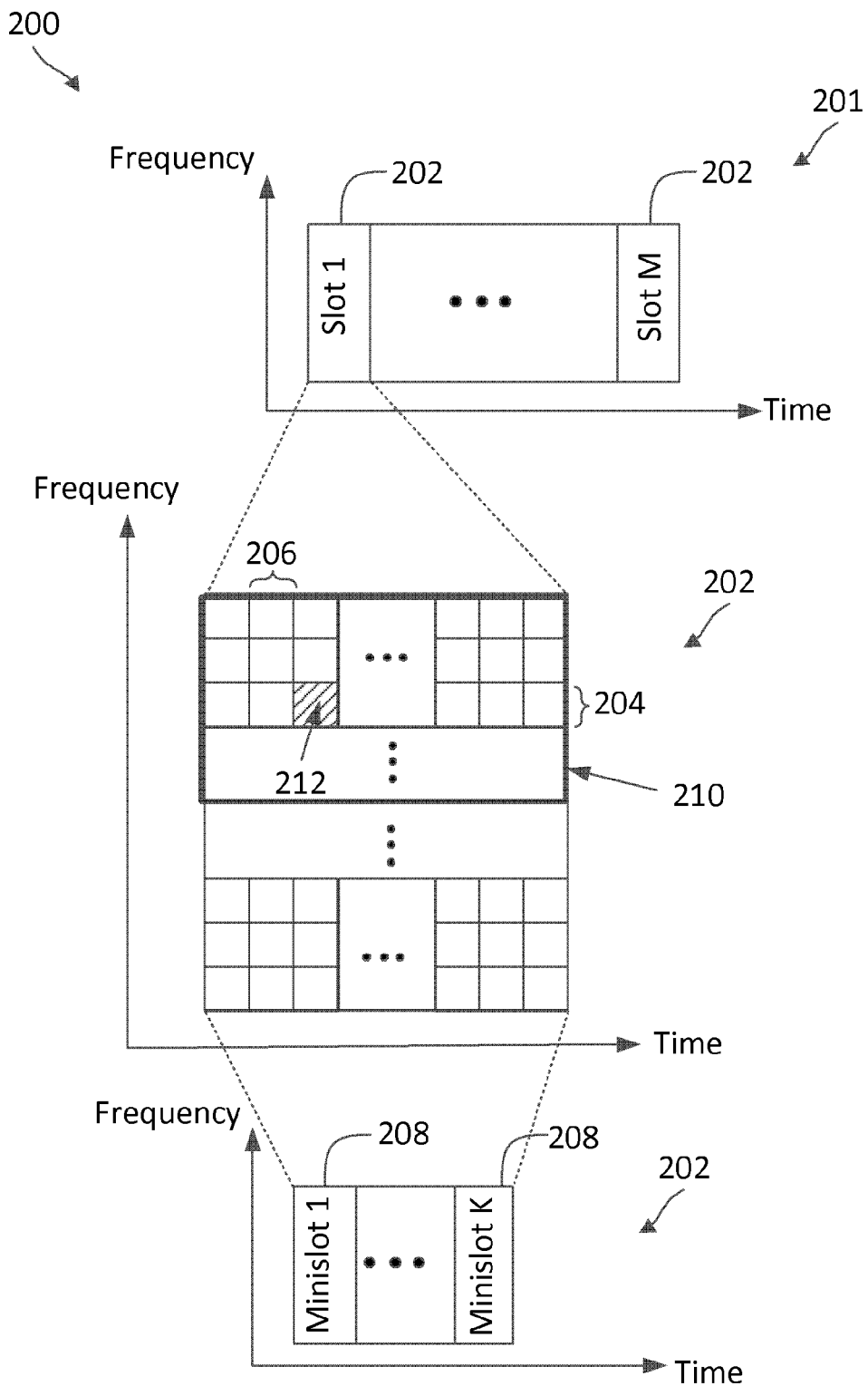
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3A:
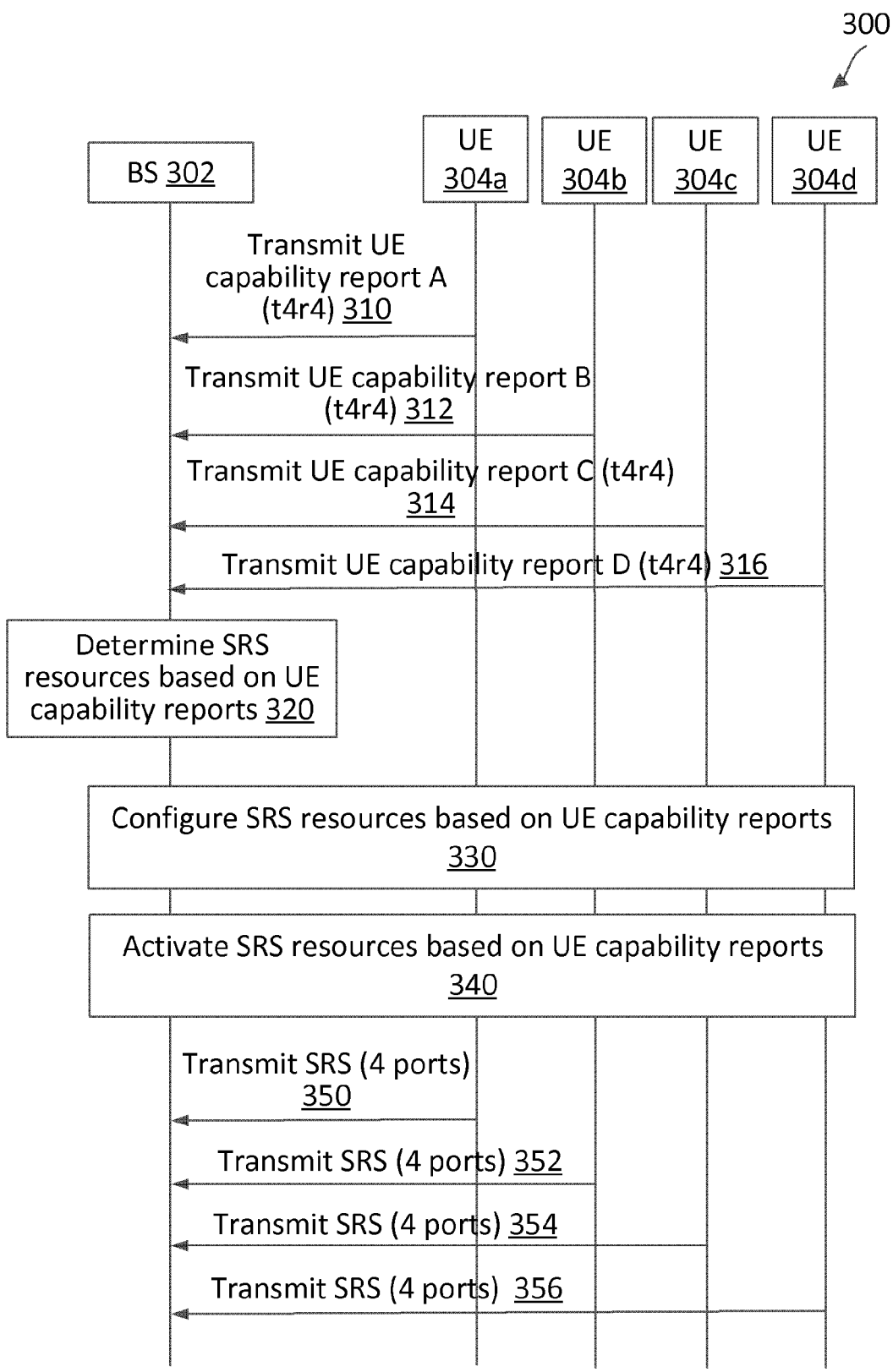
FIG. 3A is a signaling diagram of a sounding reference signal (SRS) resource configuration and channel sounding method according to some aspects of the present disclosure.
Figure 3B:
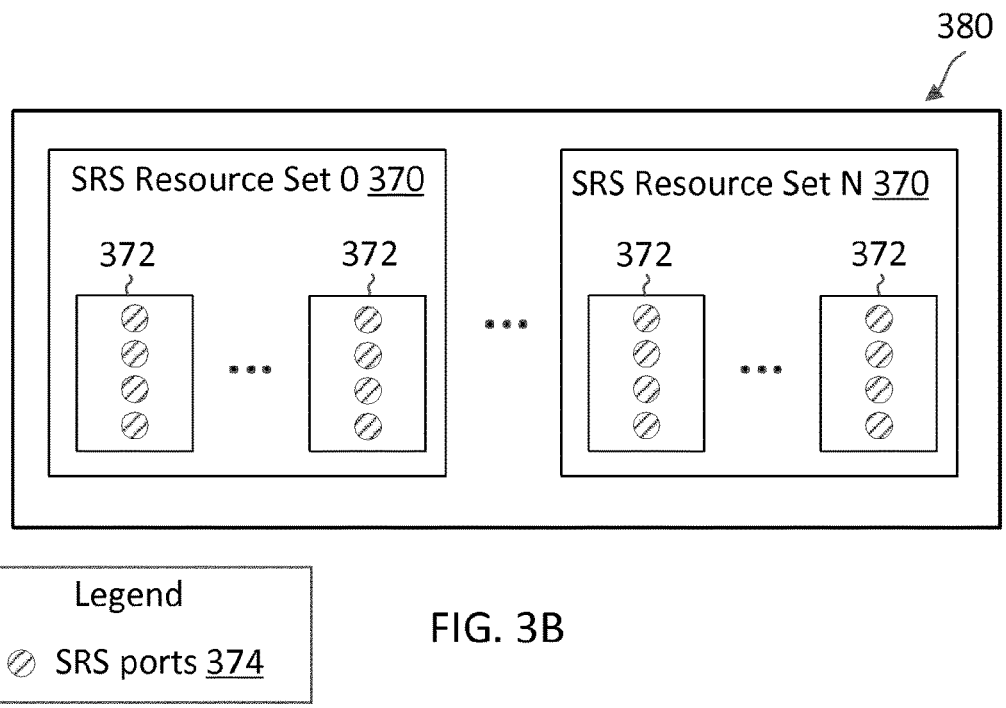
FIG. 3B illustrates an SRS resource configuration scheme according to some aspects of the present disclosure.
Figure 3C:
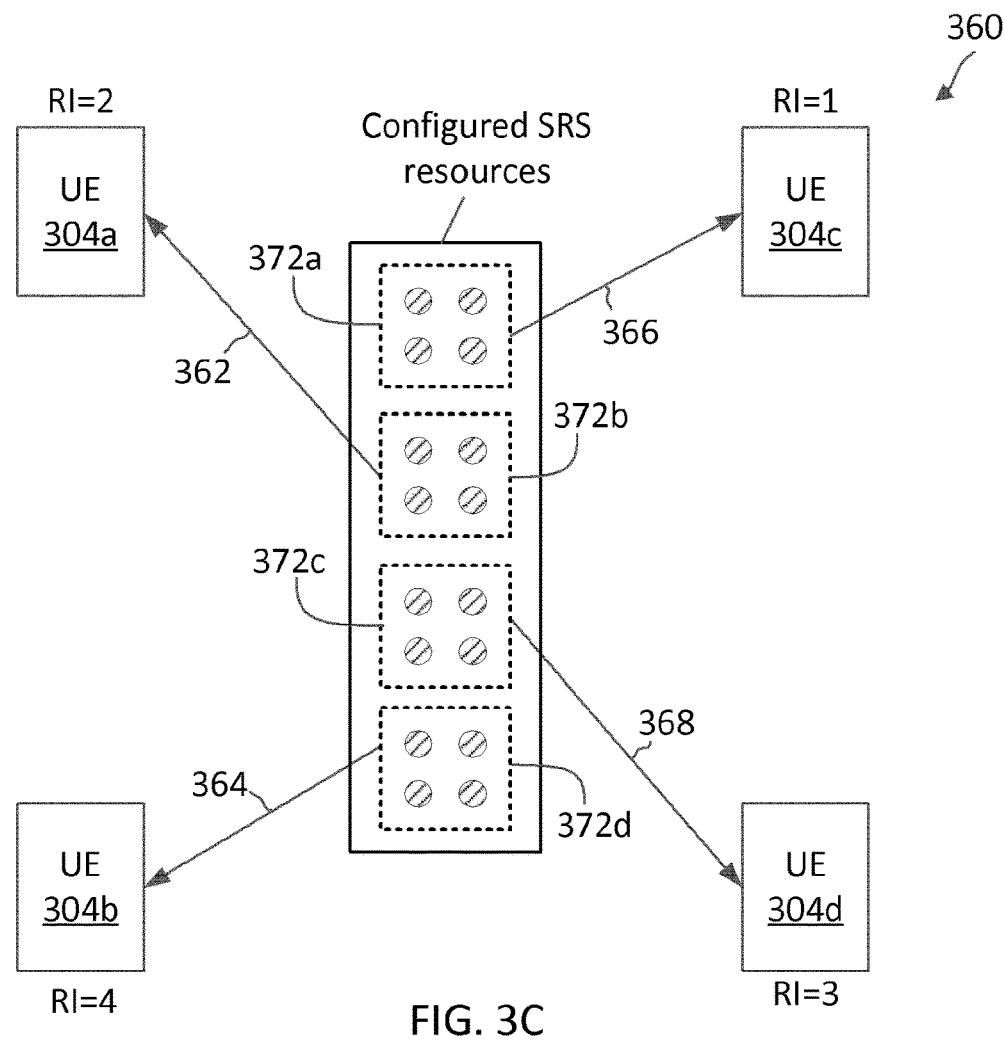
FIG. 3C illustrates an SRS resource activation scheme according to some aspects of the present disclosure.

FIG. 3A is discussed in relation to FIGS. 3B and 3C to illustrate SRS resource allocation and channel sounding mechanisms that can be employed by BSs such as the BSs 105 and UEs such as the UEs 115 in a network such as the network 100. FIG. 3A is a signaling diagram of an SRS resource configuration and channel sounding method 300 according to some aspects of the present disclosure. FIG. 3B illustrates an SRS resource configuration scheme 380 according to some aspects of the present disclosure. FIG. 3C illustrates an SRS resource activation scheme 360 according to some aspects of the present disclosure. The method 300 and the schemes 360 and 380 can be used in conjunction with the radio frame structure 200 of FIG. 2.

Referring to FIG. 3A, the method 300 may be implemented between a BS 302 and four connected or attached UEs 304 (shown as 304a, 304b, 304c, and 304d) located in a network such as the network 100. The BS 302 may correspond to a BS 105. The UEs 304 may correspond to UEs 115. While the method 300 is illustrated with four UEs 304, the method 300 can be applied to a greater number of UEs 304 or a less number of UEs 304. As illustrated, the method 300 includes a number of enumerated actions, but embodiments of the method 300 may include additional actions before, after, and in between the enumerated actions. In some embodiments, one or more of the enumerated actions may be omitted or performed in a different order.

The method 300 is implemented after the BS 302 established a connection (e.g., an RRC connection) with each of the UEs 304a, 304b, 304c, and 304d. At action 310, the UE 304a transmits a UE capability report A to the BS 302. The UE 304a may include a transmit/receive antenna port configuration in the UE capability report A. For instance, the UE 304a may support four transmit antenna ports and four receive antenna ports, and thus the transmit/receive antenna port configuration may indicate four transmit antenna ports and four receive antenna ports. In some instances, the transmit antenna ports and/or the receive antenna ports can be mapped to physical antenna elements of the UE 304a. In some other instances, the transmit antenna ports and/or the receive antenna ports are virtual ports or logical ports created by the UE 304a by applying precoding as discussed above.

In some aspects, the UE 304a may transmit the UE capability report A via RRC signaling (e.g., in the form of an RRC message). The RRC message may include a supportedSRS-TxPortSwitch information element (IE). The supportedSRS-TxPortSwitch IE may indicate a quantity of transmit antenna ports, denoted as t, and/or a quantity of receive antenna ports, denoted as r, supported by the UE 304a. For instance, the UE 304a may set the supportedSRS-TxPortSwitch IE to "t4r4" to indicate four transmit antenna ports and four receive antenna ports. In another example, the supportedSRS-TxPortSwitch IE may be set to "t2r2" to indicate two transmit antenna ports and two receive antenna ports. In general, the supportedSRS-TxPortSwitch IE may be set to "t1r1", "t1r2", "t2r4", "t1r4", or "t1r4-t2r4" to indicate various combinations of transmit/receive antenna port configurations. The various settings, for example, "t1r1", "t1r2", "t2r4", "t1r4", and "t1r4-t2r4", may be enumerated from 0 to P, where P may represent the number of allowable transmit/receive antenna settings.

At action 312, the UE 304b transmits a UE capability report B to the BS 302. At action 314, the UE 304c transmits a UE capability report C to the BS 302. At action 316, the UE 304c transmits a UE capability report C to the BS 302. At action 318, the UE 304d transmits a UE capability report D to the BS 302. Each of the UEs 304b, 304c, and 304d may use substantially similar mechanisms as the UE 304a to transmit a corresponding UE capability report. For instance, each of the UEs 304b, 304c, and 304d may support four transmit antenna ports and four receive antenna ports, and thus may include a supportedSRS-TxPortSwitch IE indicating "t4r4" in the corresponding UE capability report.

At action 320, the BS 302 determines SRS resources based on the UE capability reports received from the UE 304a, 304b, 304c, and 304d. The BS 302 may allocate and configure each of the UEs 304a, 304b, 304c, and 304d with one or more SRS resource sets (e.g., as shown in FIG. 3B) for SRS transmissions.

Referring to FIG. 3B, the scheme 380 includes a plurality of SRS resource sets 370 (shown as SRS resource set 0 to SRS resource set N). Each SRS resource set 370 may include one or more SRS resources 372. Each SRS resource 372 may include time-frequency resources. For instance, each SRS resource 372 may span one or more symbols (e.g., the symbols 206) within a slot (e.g., the slot 202) and may include one or more subcarriers (e.g., the subcarriers 204) or REs (e.g., the REs 212) within each SRS symbol. Additionally, each SRS resource 372 may be configured with one or more SRS ports 374. For instance, each SRS port 374 may be associated with one or more REs within an SRS symbol. A UE 304 may transmit an SRS via a transmit antenna port, for example, denoted as P1. The UE 304 may transmit the SRS in SRS REs that are associated with an SRS port 374 corresponding to the transmit antenna port P1. The SRS may be a predetermined waveform sequence (e.g., a Zadoff-Chu sequence). The SRS can assist the BS 302 in determining UL CSI and/or DL CSI associated with the UE 304.

In some aspects, each SRS resource set 370 may be associated with a certain resource type. For example, an SRS resource set 370 may have a resource type of periodic, semi-persistent, or aperiodic. An SRS resource set 370 with a periodic resource type may have a configured periodicity and each periodic SRS resource 372 may have a configured symbol offset within a slot. A UE 304 may utilize a periodic SRS resource 372 for periodic SRS transmission. An SRS resource set 370 with a semi-persistent resource type may have a configured periodicity similar to a periodic SRS resource set 370 and each semi-persistent resource 372 may have a configured symbol offset within a slot similar to a periodic SRS resource 372. However, a UE 304 may not transmit an SRS in a semi-persistent SRS resource 372 until the BS 302 triggers an activation (e.g., via MAC-CE) of the SRS resource 372. An SRS resource 372 in an SRS resource set 370 with an aperiodic resource type may be utilized by a UE 304 when the UE 304 receives an explicit trigger (e.g., via DCI) from the BS 302.

In some aspects, each SRS resource set 370 may be configured for a certain use case, for example, for UL CSI acquisition, DL CSI acquisition (assuming TDD channel reciprocity), and/or beam management. For instance, the BS 302 may determine UL transmission schemes and/or UL precoding based on acquired UL CSI. The BS 302 may determine antenna switching or selection based on DL CSI. In an example, for DL CSI acquisition, the BS 302 may configure a UE 304 with up to two SRS resource sets 370, each having a different resource type. In some instances, the BS 302 may configure a UE 304 with zero or one SRS resource set 370 configured with a resource type of periodic or semi-persistent. In some other instances, the BS 302 may configure a UE 304 with zero to two SRS resource sets 370, each configured with a resource type of aperiodic.

In some aspects, the BS 302 may determine a quantity of SRS ports 374 for each SRS resource 372 configured for each UE 304 according to the quantity of transmit antenna ports supported by the UE 304. For instance, if a UE 304 supports four transmit antenna ports, the BS 302 may configure the UE 304 with one or more SRS resources 372 each having four SRS ports 374 as shown in FIG. 3B. In general, if a UE 304 supports T number of transmit antenna ports, the BS 302 may configure the UE 304 with one or more SRS resources 372 each having T number of SRS ports 374, where T is a positive integer (e.g., 1, 2, 3, or 4).

In some aspects, for a UE 304 with one transmit antenna port and two receive antenna port (e.g., "t1r2"), two transmit antenna ports and four receive antenna ports (e.g., "t2r4"), one transmit antenna port and four receive antenna ports (e.g., "t1r4"), or one transmit antenna port and four receive antenna ports-two transmit antenna port and four receive antenna ports (e.g., "t1r4-t2r4"), the BS 302 may determine a total number of SRS resources 372 per SRS resource set 370 for the UE 304 based on a quantity of receive antenna ports divided by a quantity of transmit antenna ports supported by the UE 304. Additionally, the BS 302 may not configure more than one SRS resource set 370 for the UE 304 for DL purpose (e.g., for DL CSI estimation) in the same slot.

In some aspects, for a UE 304 with one transmit antenna port and one receive antenna port (e.g., "t1r1"), two transmit antenna ports and two receive antenna ports (e.g., "t2r2"), or four transmit antenna ports and four receive antenna ports (e.g., "t4r4"), the BS 302 may configure the UE 304 with one SRS resource 372 per SRS resource set 370. Additionally, the BS 302 may not configure more than one SRS resource set 370 for the UE 304 for DL purpose (e.g., for DL CSI acquisition) in the same symbol. Referring to the example where each of the UEs 304a, 304b, 304c, and 304d supports four transmit antenna ports and four receive antenna ports, the BS 302 may configure each of the UEs 304a, 304b, 304c, and 304d with one SRS resource 372 having four SRS ports 374 (e.g., the SRS resource 372a, 372b, 372c, and 372d shown in FIG. 3C).

Returning to FIG. 3A, at action 330, the BS 302 configures the UEs 304a, 304b, 304c, and 304d with SRS resources based on corresponding UE capability reports. For instance, the BS 302 may transmit an SRS configuration to each UE 304a, 304b, 304c, and 304d, for example, via an RRC configuration. A first SRS configuration for the UE 304a may indicate a first SRS resource set (e.g., the SRS resource set 370) including a single SRS resource 374a having 4 SRS ports 374. A second SRS configuration for the UE 304b may indicate a second SRS resource set including a single SRS resource 374b having 4 SRS ports 374. A third SRS configuration for the UE 304c may indicate a third SRS resource set including a single SRS resource 374c having 4 SRS ports 374. A fourth SRS configuration for the UE 304d may indicate a fourth SRS resource set including a single SRS resource 374d having 4 SRS ports 374.

As an example, the first, second, third, and fourth SRS resource sets configured for the UEs 304a, 304b, 304c, and 304d are semi-persistent or aperiodic. Thus, at action 340, the BS 302 may activate the SRS resources 372a, 372b, 372c, 372d for the UEs 304a, 304b, 304c, and 304d, respectively (e.g., as shown in FIG. 3C). In some instances, the BS 302 may activate each of the UEs 304a, 304b, 304c, and 304d via a MAC-CE or DCI.

Referring to FIG. 3C, the BS 302 may activate the SRS resource 372a for the UE 304a to transmit an SRS as shown by the arrow 362. The BS 302 may activate the SRS resource 372b for the UE 304b to transmit an SRS as shown by the arrow 364. The BS 302 may activate the SRS resource 372c for the UE 304c to transmit an SRS as shown by the arrow 366. The BS 302 may activate the SRS resource 372d for the UE 304d to transmit an SRS as shown by the arrow 368.

Returning to FIG. 3A, at action 350, upon receiving an activation for the SRS resource 372a, the UE 304a transmits an SRS to the BS 302 using the SRS resource 372a. Similarly, at action 352, the UE 304b transmits an SRS to the BS 302 using the SRS resource 372b. At action 354, the UE 304c transmits an SRS to the BS 302 using the SRS resource 372c. At action 356, the UE 304d transmits an SRS to the BS 302 using the SRS resource 372d.

As can be observed from the method 300 and/or the scheme 360, the quantity of SRS ports 374 in an SRS resource 372 used by a UE 304 for an SRS transmission is configured by the BS 302 according to the quantity of transmit and/or receive antenna ports reported by the UE 304. In other words, once the BS 302 configures a UE 304 with one, two, or four SRS ports 374, the UE 304 is to transmit SRSs using all configured one, two, or four SRS ports 374. However, in some scenarios, it may be sufficient for a UE 304 to transmits SRSs using a subset of the configured SRS ports 374, instead of all configured SRS ports 374. In some other scenarios, the UE 304 may be unable to support full SRS port transmissions.

For instance, in the illustrated example of FIG. 3C, the UE 304a may operate with a transmission rank of 2 (e.g., RI=2 for two spatial transmission layers), and thus it may be sufficient for the UE 304a to transmit SRSs using two SRS ports 374, rather than all four SRS ports. Similarly, the UE 304c may be operate with a transmission rank of 1 (e.g., RI=1 for a single spatial transmission layer), and thus it may be sufficient for the UE 304c to transmit SRS using one SRS port 374, rather than all four SRS ports. In another example, a UE 304 may not utilize SRS for UL sounding. For instance, the SRS may be utilized for sounding a linear receiver (e.g., at the BS), which may be denoted by a matrix $U_{CQI}$. The UE 304 may determine the matrix $U_{CQI}$ from a singular-value-decomposition (SVD) based on DL channel state information-reference signals (CSI-RSs). The DL CSI-RSs may be reference signals that were configured for the UE 304 to determine channel quality indicator (CQI) and/or RI. The matrix $U_{CQI}$ may have a subset of columns that are to be sounded using the SRS, but not all columns of the matrix $U_{CQI}$. Thus, the UE 304 may transmit an SRS using SRS ports corresponding to the subset of columns of the matrix $U_{CQI}$ that are to be sounded. In yet another example, a UE 304 may be power limited and thus may be unable to support full SRS port transmissions. The UE 304 may be capable of transmitting an SRS in partial or a subset of configured SRS ports 374, but not all configured SRS ports 374.

While in various scenarios or use cases, a UE 304 may not utilize all configured SRS ports 374 for SRS transmissions, the SRS resources 372 are exclusive provisioned for the UE 304. Thus, the BS 302 may not easily reuse or reclaim SRS ports 374 that are not utilized or sounded by the UE 304 for other UEs.

Accordingly, the present disclosure provides techniques for a BS (e.g., the BSs 105 and/or 302) to dynamically allocate and/or activate SRS resource(s) with a quantity of SRS ports as needed by a UE, for example, based on a current transmission rank and/or a current operating condition.

Figure 4:
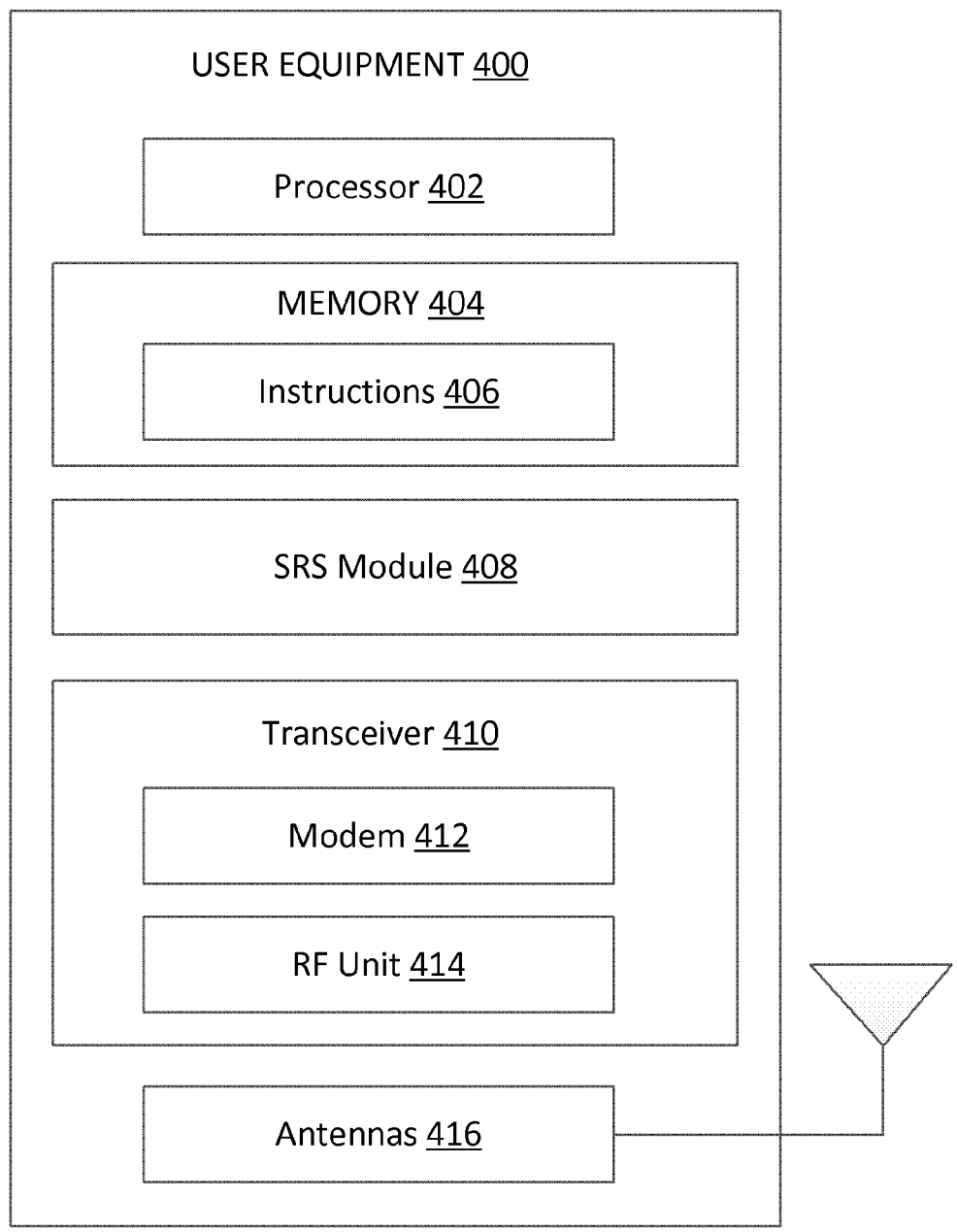
FIG. 4 is a block diagram of an exemplary base station (BS) according to some aspects of the present disclosure.

FIG. 4 is a block diagram of an exemplary UE 400 according to some aspects of the present disclosure. The UE 400 may be a UE 115 in the network 100 as discussed above in FIG. 1. As shown, the UE 400 may include a processor 402, a memory 404, an SRS module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 2, 6A-6C, and 8. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SRS module 408 may be implemented via hardware, software, or combinations thereof. For example, the SRS module 408 may be implemented as a processor, circuit, and/or instructions 406 stored in the memory 404 and executed by the processor 402. In some examples, the SRS module 408 can be integrated within the modem subsystem 412. For example, the SRS module 408 can be implemented by a combination of software components (e.g., executed by a DSP or a general processor) and hardware components (e.g., logic gates and circuitry) within the modem subsystem 412.

The SRS module 408 may be used for various aspects of the present disclosure, for example, aspects of FIGS. 2, 6A-6C, and 8. For example, the SRS module 408 is configured to receive, from a BS (e.g., the BSs 105, 302, 500, and/or 602), a configuration indicating a plurality of SRS resources configured for the UE, where a first SRS resource of the plurality of SRS resources includes a different quantity of SRS ports than a second SRS resource of the plurality of SRS resources. The SRS module 408 may also be configured to receive, from the BS, a request to activate one or more SRS ports within the plurality of SRS resources for a first SRS transmission. The one or more SRS ports may be associated with one or more SRS resources of the plurality of SRS resources. The request may be in the form of a MAC-CE or DCI. The SRS module 408 may also be configured to transmit, to the BS, the first SRS transmission using the one or more SRS ports within the configured plurality of SRS resources.

In some aspects, the SRS module 408 is further configured to transmit, to the BS, a UE capability report indicating a quantity of transmit antenna ports supported by the UE 400. In some aspects, a quantity of SRS resources in the plurality of SRS resources configured for the UE is equal to or greater than the quantity of transmit antenna ports supported by the UE 400. In some aspects, the transmit antenna ports may correspond to transmit antenna elements at the antennas 416. In some aspects, the transmit antenna ports may be logical antenna ports created by the UE 400 by applying precoding to the transmit antenna elements.

In some aspects, the SRS module 408 is further configured to transmit, to the BS, an RI report including transmission rank information. In some aspects, a quantity of the one or more SRS ports activated may be based at least in part on the transmission rank information associated with the UE 400. In some aspects, a quantity of the one or more SRS ports can be less than the quantity of transmit antenna ports supported by the UE 400. For example, the UE 400 may support four transmit antenna ports, but may operate at a transmission rank of 2. Thus, the BS may activate an SRS resource with two SRS ports for the UE 400 to sound an SRS transmission.

In some aspects, the SRS module 408 is further configured to receive, from the BS, a further request to activate a plurality of SRS ports within the plurality of SRS resources for a second SRS transmission. When a quantity of the plurality of activated SRS ports is greater than a quantity of spatial layers currently supported by the UE 400, the SRS module 408 is further configured to transmit, to the BS, the second SRS transmission using a first subset of the plurality of SRS ports, where a quantity of SRS ports in the first subset of the plurality of SRS ports corresponds to the quantity of spatial layers currently supported by the UE, and transmit, to the BS, a repetition of the second SRS transmission using a second subset of the plurality of SRS ports non-overlapping with the first subset of the plurality of SRS ports. In some other aspects, when a quantity of the plurality of activated SRS ports is greater than a quantity of spatial layers currently supported by the UE 400, the SRS module 408 is further configured to transmit, to the BS, the second SRS transmission using a first subset of the plurality of SRS ports, where a quantity of SRS ports in the first subset of the plurality of SRS ports corresponds to the quantity of spatial layers currently supported by the UE, and refrain from transmitting a SRS in remaining SRS ports of the plurality of SRS ports. Mechanisms for utilizing dynamically allocated and/or activated SRS resources for channel sounding are described in greater detail herein.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PDSCH signal, PDCCH signal, SRS resource configuration, SRS resource activation, SRS resource deactivation) from the modem subsystem 412 (on outbound transmissions) or of transmissions originating from another source such as a UE 115. The RF unit 414 may be further configured to perform analog beamforming in conjunction with the digital beamforming. Although shown as integrated together in transceiver 410, the modem subsystem 412 and/or the RF unit 414 may be separate devices that are coupled together at the UE 400 to enable the UE 400 to communicate with other devices.

The RF unit 414 may provide modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to some aspects of the present disclosure. The antennas 416 may further receive data messages transmitted from other devices and provide the received data messages for processing and/or demodulation at the transceiver 410. The transceiver 410 may provide the demodulated and decoded data (e.g., PUSCH signal, UL data, SRSs, UE capability reports, RI reports) to the SRS module 408 for processing. The antennas 416 may include multiple antennas of similar or different designs to sustain multiple transmission links.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
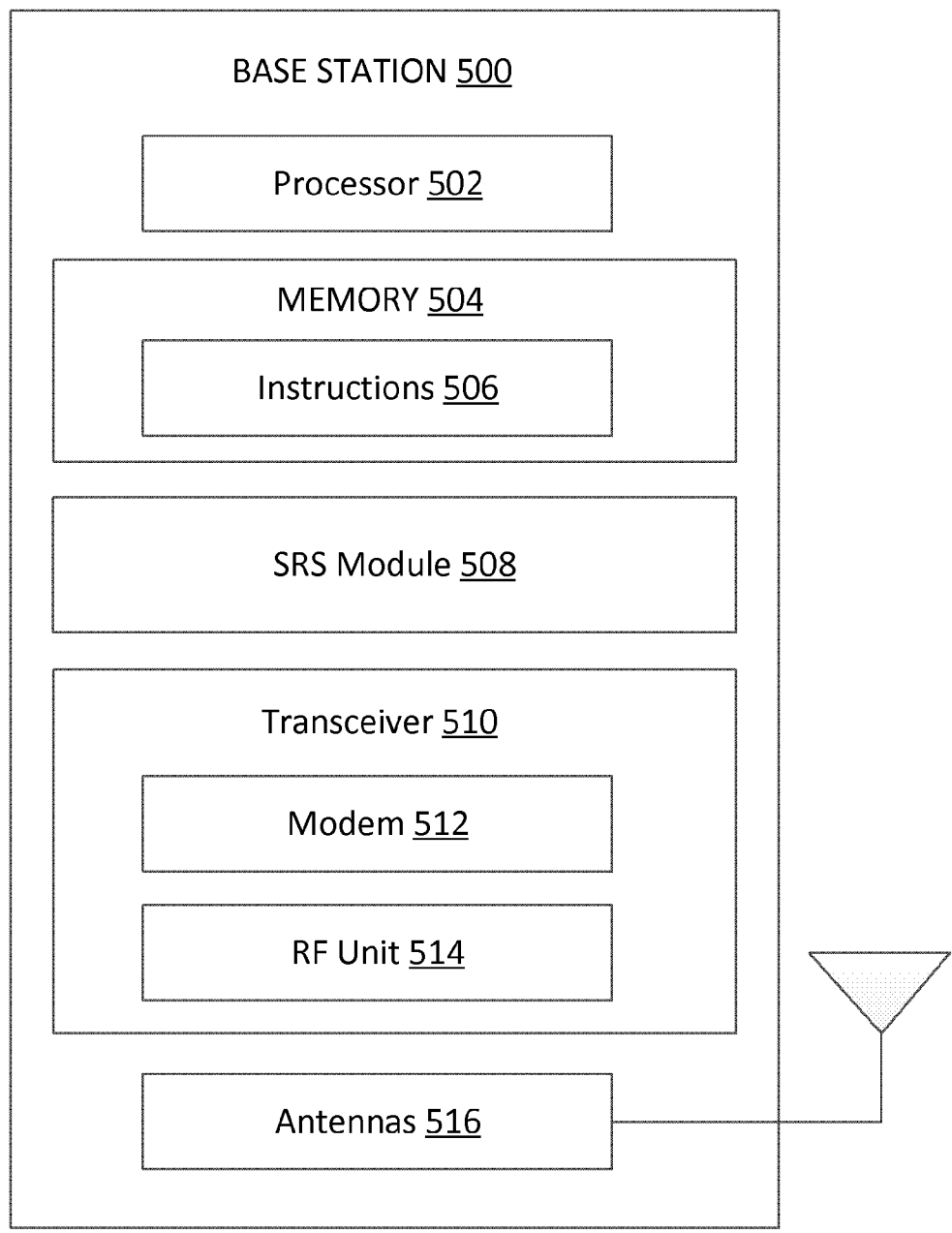
FIG. 5 is a block diagram of an exemplary user equipment (UE) according to some aspects of the present disclosure.

FIG. 5 is a block diagram of an exemplary BS 500 according to some aspects of the present disclosure. The BS 500 may be a BS 105 discussed above in FIG. 1. As shown, the BS 500 may include a processor 502, a memory 504, a SRS module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 2, 6A-6C, and 7. Instructions 506 may also be referred to as program code, which may be interpreted broadly to include any type of computer-readable statement(s) as discussed above with respect to FIG. 4.

The SRS module 508 may be implemented via hardware, software, or combinations thereof. For example the SRS module 508 may be implemented as a processor, circuit, and/or instructions 506 stored in the memory 504 and executed by the processor 502. In some examples, the SRS module 508 can be integrated within the modem subsystem 512. For example, the SRS module 508 can be implemented by a combination of software components (e.g., executed by a DSP or a general processor) and hardware components (e.g., logic gates and circuitry) within the modem subsystem 512.

The SRS module 508 may be used for various aspects of the present disclosure, for example, aspects of FIGS. 2, 6A-6C, and 7. The SRS module 508 is configured to determine one or more SRS resource sets for a group of UEs (e.g., the UEs 115, 304, and/or 400) including a first UE. The SRS resource sets may include a plurality of SRS resources, where a first SRS resource of the plurality of SRS resources includes a different quantity of SRS ports than a second SRS resource of the plurality of SRS resources. The one or more SRS resource sets can be semi-persistent or aperiodic. The SRS module 508 may also be configured to transmit, to the first UE, a configuration indicating the plurality of SRS resources. The SRS module 508 may also be configured to transmit, to the first UE, a request to activate one or more SRS ports within the plurality of SRS resources for a first SRS transmission, and receive, from the first UE, the first SRS transmission from the one or more SRS ports within the plurality of SRS resources. The request can be carried in a MAC-CE or DCI. The one or more SRS ports may be associated with one or more SRS resources of the plurality of SRS resources.

In some aspects, the SRS module 508 is further configured to receive, from the first UE, a UE capability report indicating a quantity of transmit antenna ports supported by the first UE. The SRS module 508 may also be configured to determine the plurality of SRS resources for the first UE such that a quantity of the plurality of SRS resources is equal to or greater than a quantity of transmit antenna ports supported by the UE.

In some aspects, the SRS module 508 is further configured to receive, from the first UE, an RI report indicating a quantity of spatial layers currently supported by the first UE. The SRS module 508 may also be configured to select a subset of the plurality of SRS resources having the one or more SRS ports for the first UE based on the quantity of spatial layers indicated by the first UE. The SRS module 508 may configured to select the subset of SRS resource such that a quantity of the one or more SRS ports of the subset of SRS resources matches the quantity of spatial layers supported by the first UE. Thus, in some instances, a quantity of the one or more SRS ports can be less than the quantity of transmit antenna ports supported by the first UE. For instance, the first UE may support four transmit antenna ports, but may operate at a transmission rank of 2. Thus, the SRS module 508 may be configured to activate an SRS resource with two SRS ports for the first UE to sound an SRS transmission.

In some aspects, the SRS module 508 is further configured to determine whether there is a valid RI report received from a second UE. The SRS module 508 may be configured to transmit a request to activate a plurality of SRS ports for a second SRS transmission based on a quantity of transmit antenna ports supported by the second UE if there is no valid RI report received from the second UE. In some aspects, the SRS module 508 may also be configured determine whether an RI report is received from a second UE based on whether a gap duration between a last RI report received from the second UE and a transmission occasion for the second SRS transmission satisfies a threshold.

In some instances, the SRS module 508 is further configured to transmit, to a second UE, a request to activate a plurality of SRS ports for a second SRS transmission and receive, from the second UE, the second SRS transmission from a first subset of the plurality of SRS ports less than all of the plurality of SRS ports. The SRS module 508 may also be configured to receive, from the second UE, a repetition of the second SRS transmission from a second subset of the plurality of SRS ports non-overlapping with the first subset of the plurality of SRS ports. Mechanisms for performing dynamic SRS resource allocation and activation for UE channel sounding are described in greater detail herein.

As shown, the transceiver 510 may include a modem subsystem 512 and an RF unit 514. The transceiver 510 can be configured to communicate bi-directionally with other devices, such as the BSs 105. The modem subsystem 512 may be configured to modulate and/or encode the data from the memory 504 and/or the configured transmission module 407 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PUSCH signal, UL data, SRSs, UE capability reports, RI reports) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 500 to enable the BS 500 to communicate with other devices.

The RF unit 514 may provide modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., PDSCH signal, PDCCH, DL data, SRS resource configuration, SRS resource activation, SRS resource deactivation) to the configured transmission module 407 for processing. The antennas 516 may include multiple antennas of similar or different designs in order to sustain multiple transmission links. The RF unit 514 may configure the antennas 516.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6A:
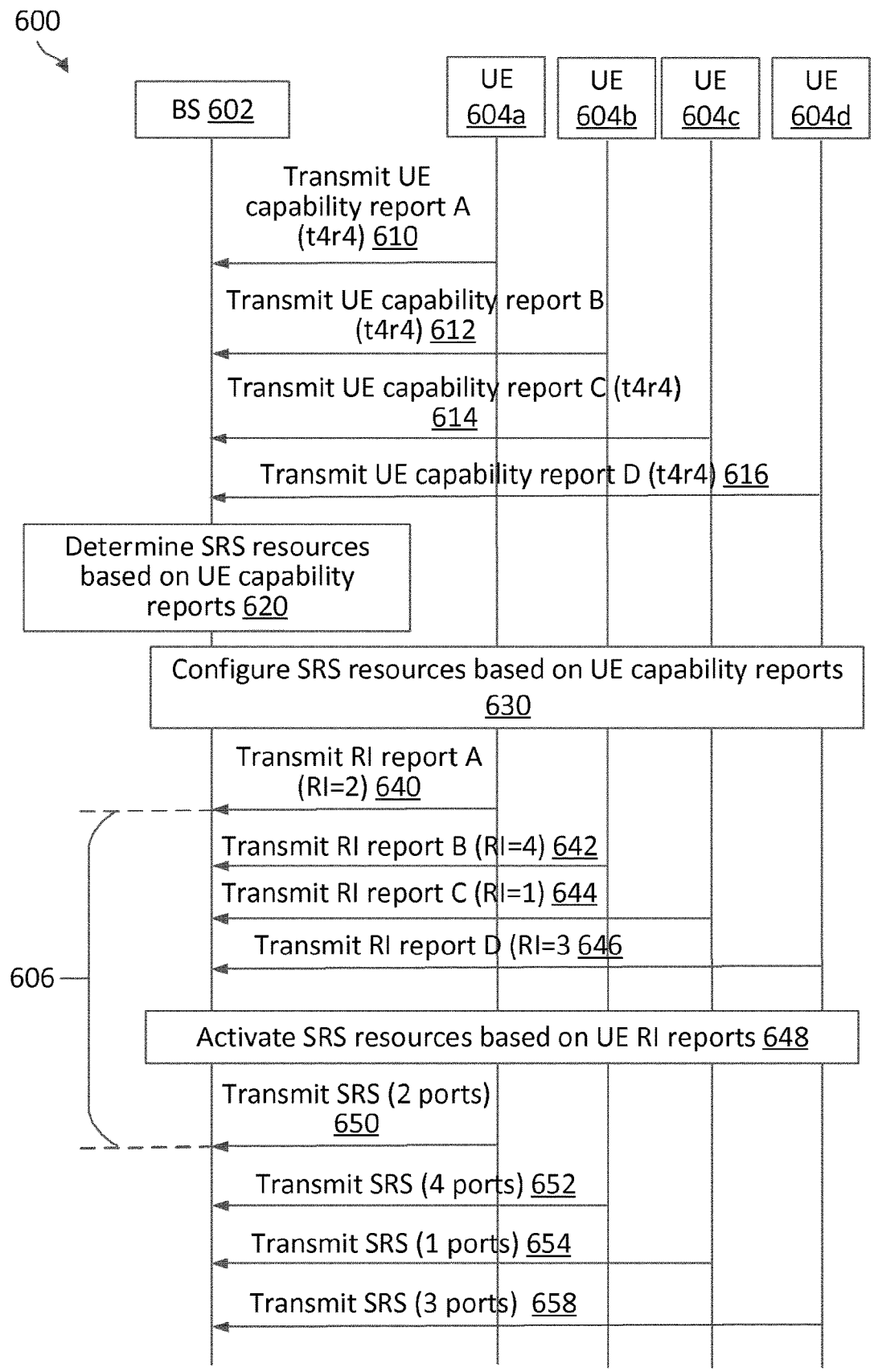
FIG. 6A is a signaling diagram of a dynamic SRS resource configuration and channel sounding according to some aspects of the present disclosure.
Figure 6B:
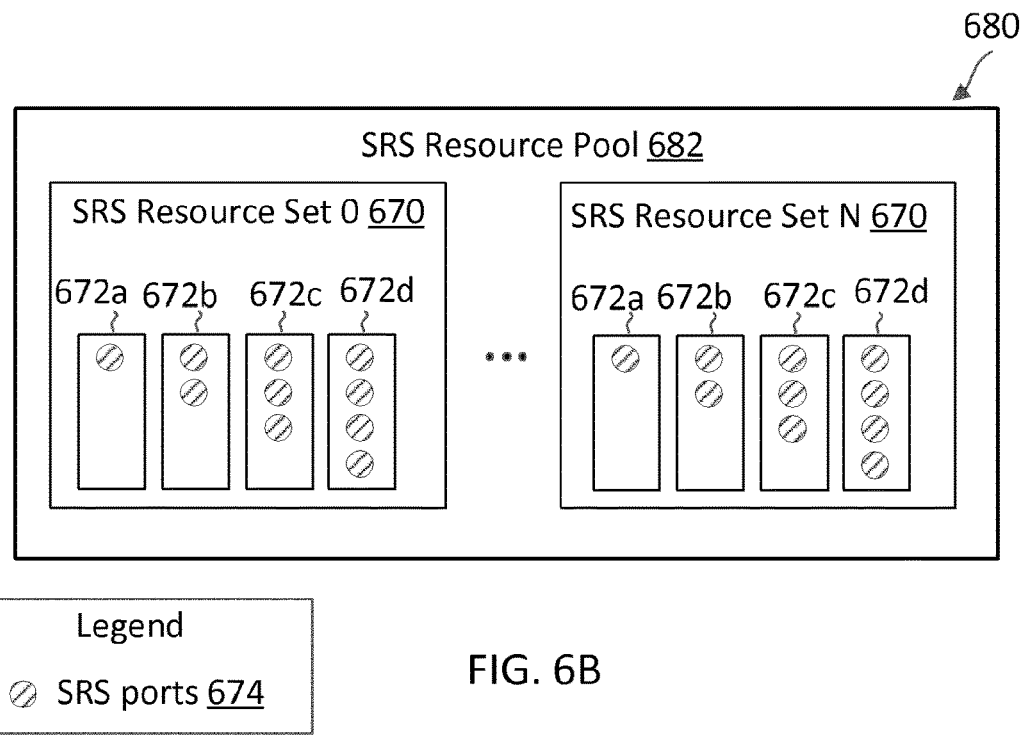
FIG. 6B illustrates a dynamic SRS resource configuration scheme according to some aspects of the present disclosure.
Figure 6C:
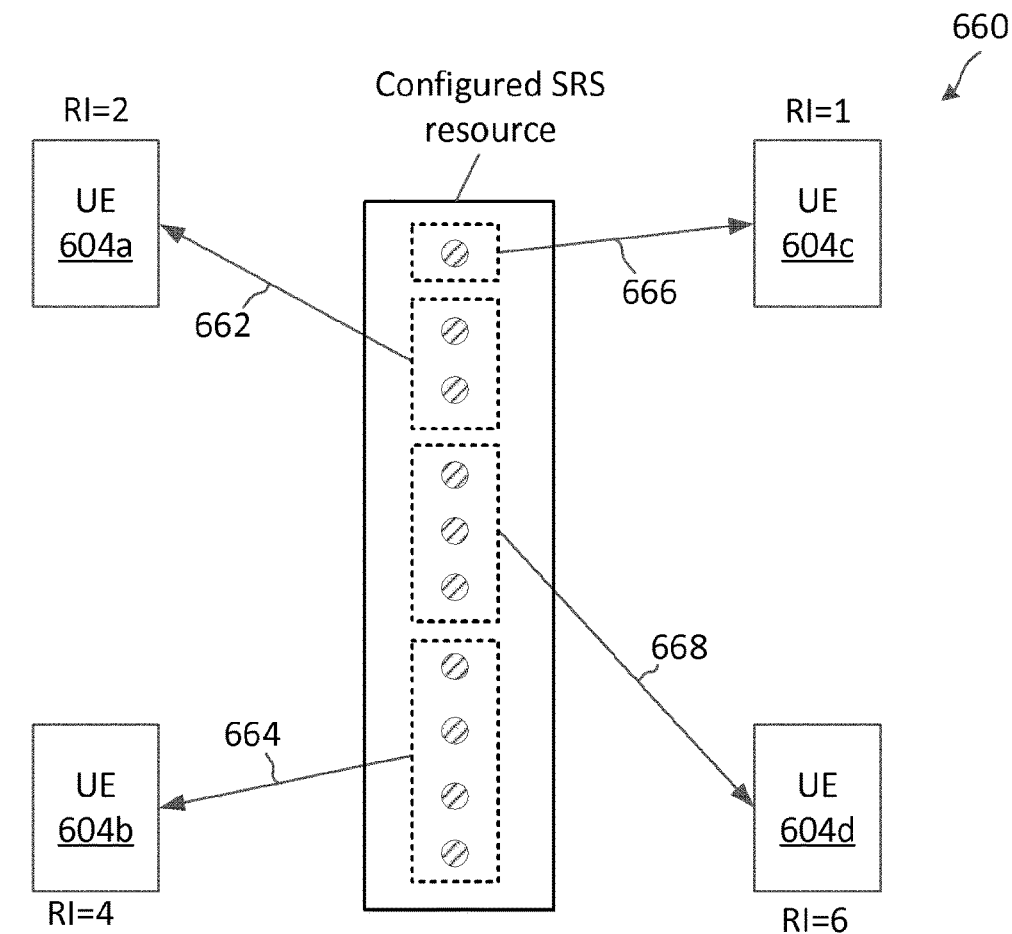
FIG. 6C illustrates an SRS resource activation scheme according to some aspects of the present disclosure.

FIG. 6A is discussed in relation to FIGS. 6B and 6C to illustrate dynamic SRS resource allocation and channel sounding mechanisms that can be employed by BSs such as the BSs 105, 302, and/or 500 and UEs such as the UEs 115, 304, and/or 400 in a network such as the network 100. FIG. 6A is a signaling diagram of a dynamic SRS resource configuration and channel sounding method 600 according to some aspects of the present disclosure. FIG. 6B illustrates a dynamic SRS resource configuration scheme 680 according to some aspects of the present disclosure. FIG. 6C illustrates an SRS resource activation scheme 660 according to some aspects of the present disclosure. The method 600 and the schemes 660 and 680 can be used in conjunction with the radio frame structure 200 of FIG. 2.

Referring to FIG. 6A, the method 600 may be implemented between a BS 602 and four connected or attached UEs 604 (shown as 604a, 604b, 604c, and 604d) located in a network such as the network 100. The BS 602 may be similar to the BSs 105, 302, and/or 600. The UEs 604 may correspond to UEs 115, 304, and/or 500. While the method 600 is illustrated with four UEs 604, the method 600 can be applied to a greater number of UEs 604 or a less number of UEs 604. As illustrated, the method 600 includes a number of enumerated actions, but embodiments of the method 600 may include additional actions before, after, and in between the enumerated actions. In some embodiments, one or more of the enumerated actions may be omitted or performed in a different order.

Similar to the method 300, the method 600 may begin with the UEs 604a, 604b, 604c, and 604d reporting UE capabilities to the BS 602 at actions 610, 612, 614, and 616, respectively. The actions 610, 612, 614, and 616 are similar to the actions 310, 312, 314, and 316 of the method 300, respectively. Accordingly, for sake of brevity, details of those steps will not be repeated here.

At action 620, the BS 602 determines SRS resources based on the UE capability reports received from the UE 604a, 604b, 604c, and 604d. In some aspects, the BS 602 may allocate or configure a SRS resource pool for sharing among a group of UEs, for example, including the UEs 604a, 604b, 604c, and 604d. The SRS resource pool may include one or more SRS resource sets (e.g., as shown in FIG. 6B).

Referring to FIG. 6B, the BS 602 may configure an SRS resource pool 682 including one or more SRS resource sets 670 (shown as SRS resource set 0 to SRS resource set N) for the group of UEs 604. Each SRS resource set 670 may be have a resource type of aperiodic or semi-persistent. The BS 602 may further configure a periodicity for an SRS resource set 670 with a resource type of semi-persistent. In general, a semi-persistent SRS resource set 670 and an aperiodic SRS resource set 670 may operate in substantially similar mechanisms as a semi-persistent SRS resource set 370 and an aperiodic SRS resource set 370, respectively, discussed above with reference to FIG. 3B. Each SRS resource set 670 may include a plurality of SRS resources 672 (shown as 672a, 672b, 672c, and 672d). The BS 602 may determine a quantity of SRS resources 672 for each SRS resource set 670 based on a quantity of transmit antenna ports supported by the UE 604. The SRS resources 672 in an SRS resource set 670 may include different quantity of SRS ports 674 (e.g., the SRS ports 374). For example, if a UE 604 in a group of UEs support four transmit antenna ports (e.g., T=4) and four receive antenna ports, the BS 602 may configure at least four SRS resources 672 for an SRS resource set 670, where a first SRS resource 672a may have one SRS port 674, a second SRS resource 672b may have two SRS ports 674, a third SRS resource 672c may have three SRS ports 674, and a fourth SRS resource 672d may have four SRS ports 674 as shown.

By configuring SRS resources 672 with different quantity of SRS ports 674, the BS 602 can dynamically activate a SRS resource 672 with a suitable number of SRS ports 674 for a UE 604 to sound an SRS transmission based on a current operating condition. In general, the BS 602 may configure at least M number of SRS resources 672 in one more SRS resource sets 670, where M is less than or equal to T, and each SRS resource 672 may have m quantity of SRS ports 674, where m may vary from 1 to M. Referring to the example where a UE 604 includes four transmit antenna elements, the BS 602 may configure a first SRS resource 672a with one SRS port 674, a second SRS resource 672b with two SRS ports 674, a third SRS resource 672c with three SRS ports 674, and a fourth SRS resource 672d with four SRS ports 674 in a single SRS resource set 670 as shown. In another example, the BS 602 may configure a first SRS resource 672 with one SRS port 674 and a second SRS resource 672 with two SRS ports 674 in a first SRS resource set 670, and may configure a third SRS resource 672 with three SRS ports 674 and a fourth SRS resource 672 with four SRS ports 674 in a second SRS resource set 670. In some instances, the first SRS resource set 670 and the second SRS resource set 670 may have the same resource type (e.g., aperiodic or semi-persistent). In some other instances, the first SRS resource set 670 and the second SRS resource set 670 may have different resource types.

Returning to FIG. 6A, at action 630, the BS 602 configures the UEs 604a, 604b, 604c, and 604d with SRS resources based on corresponding UE capability reports. For instance, the BS 602 may transmit an SRS configuration to each UE 604a, 604b, 604c, and 604d, for example, via an RRC configuration. The SRS configuration for each UE 604a, 604b, 604c, and 604d may be the same since the BS 602 configures the SRS resource pool for sharing among the UE 604a, 604b, 604c, and 604d. The SRS configuration may indicate an SRS resource pool (e.g., the SRS resource pool 682). The SRS configuration may also indicate SRS resource sets (e.g., the SRS resource sets 670) within the SRS resource pool. The SRS configuration may also indicate SRS resources (e.g., the SRS resources 672) within each SRS resource set. For example, the SRS configuration may indicate the symbol location and/or REs allocated for each SRS resource, the number of SRS ports (e.g., the SRS ports 674) within each SRS resource, and/or the association between the SRS ports and the SRS REs.

At action 640, the UE 604a transmit an RI report A to the BS 602 indicating that the UE 604a currently operates with a transmission rank of 2 (e.g., RI=2 with two spatial layers). The UE 604a may determine the transmission rank based on various reference signal measurements and/or interference measurements. Similarly, at action 642, the UE 604b transmit an RI report B to the BS 602 indicating that the UE 604b currently operates with a transmission rank of 4 (e.g., RI=4 with four spatial layers). At action 644, the UE 604c transmit an RI report C to the BS 602 indicating that the UE 604c currently operates with a transmission rank of 2 (e.g., RI=1 with one spatial layers). At action 646, the UE 604d transmit an RI report D to the BS 602 indicating that the UE 604d currently operates with a transmission rank of 3 (e.g., RI=3 with three spatial layers).

At action 650, the BS 602 activates SRS resources for the UEs 604a, 604b, 64c, and 604d to transmit SRSs. The BS 602 may determine which SRS resource 672 in the SRS resource pool 682 to activate for each UE 604 based on a current transmission rank of the UE 604 (e.g., as shown in FIG. 6C). The BS 602 may select a subset of configured SRS resources 672 for a UE 604 such that the quantity of SRS ports 674 associated with the subset of configured SRs resources 672 is equal to or greater than the RI reported by the UE 604. The BS 602 may indicate an SRS resource activation via a MAC-CE or DCI.

Referring to FIG. 6C, the BS 602 may activate the SRS resource 672b with two SRS ports 674 for the UE 304a to sound an SRS transmission based on the UE 304a indicating an RI of 2 (as shown by the arrow 662). The BS 602 may activate the SRS resource 672d with four SRS ports 674 for the UE 304b to sound an SRS transmission based on the UE 304a indicating an RI of 4 (as shown by the arrow 664). The BS 602 may activate the SRS resource 672a with one SRS port 674 for the UE 304c to sound an SRS transmission based on the UE 304c indicating an RI of 1 (as shown by the arrow 666). The BS 602 may activate the SRS resource 672c with three SRS ports 674 for the UE 304d to sound an SRS transmission based on the UE 304d indicating an RI of 3 (as shown by the arrow 668).

Returning to FIG. 6A, at action 650, upon receiving an activation for the SRS resource 672b, the UE 604a transmits an SRS to the BS 602 using the SRS resource 672b with two SRS ports 674. Similarly, at action 652, in response to the BS 602's activation, the UE 604b transmits an SRS to the BS 602 using the SRS resource 672d with four SRS ports 674. At action 654, in response to the BS 602's activation, the UE 604c transmits an SRS to the BS 602 using the SRS resource 672a with one SRS port 674. At action 656, in response to the BS 602's activation, the UE 604d transmits an SRS to the BS 602 using the SRS resource 672c with three SRS port 674.

In some aspects, the BS 602 may determine whether there is a valid RI report from a UE 604 to avoid using an outdated RI report or SRS resource selection. The BS 602 may set a time threshold to filter out outdated RI report for SRS resource selection. The time threshold can be in any suitable time units. In some instances, the time threshold can be in units of slots (e.g., the slots 202). For instance, the BS 602 may determine whether a gap duration between a last RI report received from a UE 604 and an upcoming SRS transmit occasion of the UE 604 is longer than the time threshold. If the gap duration is longer the time threshold, the BS 602 may determine that there is no valid RI report from the UE 604. When there is no valid rank information for the UE 604, the BS 602 may activate an SRS resource 672 (e.g., the SRS resource 672d) with a maximum number of SRS ports 674 (e.g., corresponding to a quantity of transmit antenna ports supported by the UE 604) for the UE 604 to sound an SRS transmission. If the gap duration satisfies the time threshold, the BS 602 may utilize the transmission rank in the last RI report to select an SRS resource 672 with a quantity of SRS ports matching the UE 604's transmission rank. In the illustrated example of FIG. 6A, a gap duration 606 between a last RI report received from the UE 604a (at action 640) and an upcoming SRS transmission (at action 660) satisfies a time threshold. Accordingly, the BS 602 selects the SRS resource 672b with two SRS ports 674 matching a rank of 2 as reported by the UE 604a (at action 640).

In some aspects, when there is no SRS resource 672 with a quantity of SRS ports 674 matching the RI of a UE 604 available in the SRS resource pool 682, the BS 602 may activate the UE 604 with an SRS resource 672 having a greater number of SRS ports 674 (e.g., L) than the RI of the UE 604. When the UE 604 is activated with an SRS resource 672 having a greater number of SRS ports 674 than the UE 604's RI, the UE 604 may repeat an SRS transmission in the remaining (L-RI) quantity of SRS ports 674. As an example, a UE 604 may have an RI of 2. If the UE 604 receives an activation for an SRS resource 672 with four SRS ports 674, the UE 604 may transmit an SRS transmission using two SRS ports 674 and may repeat the SRS transmission in the remaining two SRS ports 674. Alternatively, the UE 604 may mute the (L-RI) quantity of SRS ports 674. Referring to the same example, if a UE 604 receives an activation for an SRS resource 672 with four SRS ports 674 when the UE is currently operating with a RI of 2, the UE 604 may transmit an SRS transmission using two SRS ports 674 and may mute or stay silence in the remaining two SRS ports 674. In some aspects, the UE 604 may select the first two SRS ports 674 for the SRS transmission and mute the other two SRS ports 674. For instance, the four SRS ports 674 may be identified by SRS port numbers (e.g., SRS port 1, SRS port 2, SRS port 2, and SRS port 4) and the UE 604 may transmit the SRS using SRS port 1 and SRS port 2. In some other instances, the UE 604 may select any two of the four SRS ports 674 for the SRS transmission and the BS 602 may perform blind decoding to detect the SRS ports 674 used by the UE 604 to transmit the SRS. In some aspects, the BS 602 may configure the UE 604 to mute the remaining two (e.g., L-RI) SRS ports 674 and may reclaim the two unused SRS ports 674 for another UE 604 to sound an SRS transmission. For instance, another UE 604 may have an RI of 2, and thus may transmit an SRS transmission using the two unused SRS ports 674.

In some aspects, a BS 602 may de-activate one or more SRS resources 672 that were previously activated for a UE 604, for example, by sending a MAC-CE or DCI indicating the deactivation. Upon receiving a deactivation, the UE 604 may not transmit SRS in the one or more deactivated SRS resources 672. In some aspects, the BS 602 may transmit an SRS resource activation (e.g., a MAC-CE) for a UE 604 in advance of the activated SRS resource. For instance, there may be a minimum time interval between an activation signaling (e.g., MAC-CE) and an earliest subframe or slot (e.g., the slots 202) for transmission of the activated SRS resource in slot X. In some aspects, the BS 602 may transmit a deactivation command to a UE 604 during a subframe or slot n (e.g., a slot 202). The UE 604 may not transmit in the deactivated SRS resource after slot n+Y.

Figure 7:
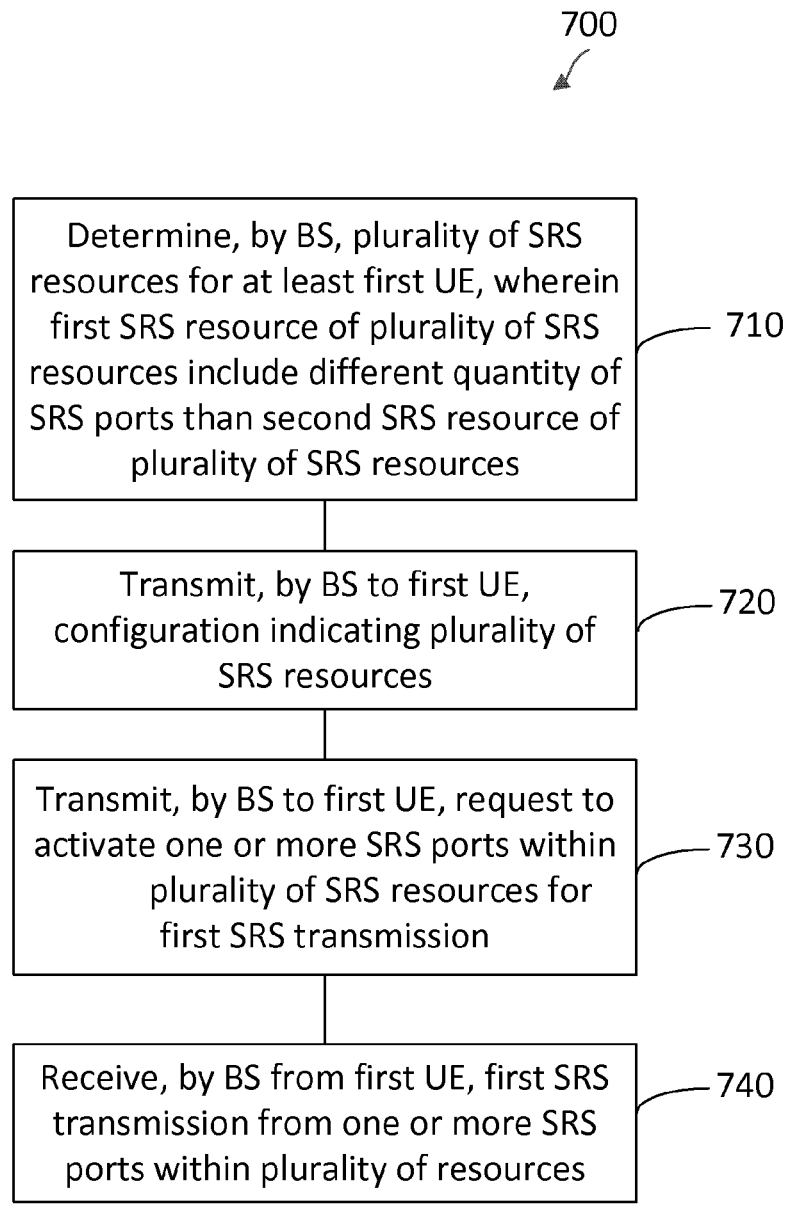
FIG. 7 is a flow diagram of a wireless communication method according to some aspects of the present disclosure.

FIG. 7 is a flow diagram of a wireless communication method 700 according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the BSs 105, 302, 500, and/or 602 may utilize one or more components, such as the processor 502, the memory 504, the SRS module 508, the transceiver 510, the modem 512, and the one or more antennas 516, to execute the steps of method 700. The method 700 may employ similar mechanisms as in the methods 300 and 600 discussed above with reference to FIGS. 3A and 6, respectively, and the schemes 380, 360, 680, and 660 discussed above with reference to FIGS. 3B, 3C, 6B, and 6C, respectively. As illustrated, the method 700 includes a number of enumerated steps, but aspects of the method 700 may include additional steps before, after, and in between the enumerated steps. In some aspects, one or more of the enumerated steps may be omitted or performed in a different order.

At block 710, a BS (e.g., the BSs 105, 302, 500, and/or 602) determines a plurality of SRS resources (e.g., the SRS resources 672) for at least a first UE (e.g., the UEs 115, 304, 400, and/or 604), where a first SRS resource of the plurality of SRS resources includes a different quantity of SRS ports (e.g., the SRS ports 674) than a second SRS resource of the plurality of SRS resources. In some instances, the BS may utilize one or more components, such as the processor 502, the memory 504, the SRS module 508, the transceiver 510, the modem 512, and the one or more antennas 516, to determine the plurality of SRS resources for at the first UE.

In some aspects, the determining the plurality of SRS resources includes determining, by the BS, one or more SRS resource sets (e.g., SRS resource sets 670) for a group of UEs including the first UE, the one or more SRS resource sets including the plurality of SRS resources. In some aspects, the one or more SRS resource sets are at least one of semi-persistent or aperiodic.

At block 720, the BS transmits, to the first UE, a configuration indicating the plurality of SRS resources. In some instances, the BS may utilize one or more components, such as the processor 502, the memory 504, the SRS module 508, the transceiver 510, the modem 512, and the one or more antennas 516, to transmit the configuration indicating the plurality of SRS resources.

At block 730, the BS transmits, to the first UE, a request to activate one or more SRS ports within the plurality of SRS resources for a first SRS transmission. In some instances, the BS may utilize one or more components, such as the processor 502, the memory 504, the SRS module 508, the transceiver 510, the modem 512, and the one or more antennas 516, to transmit the request to activate the one or more SRS ports within the plurality of SRS resources for the first SRS transmission.

In some aspects, the one or more SRS ports are associated with one or more SRS resources of the plurality of SRS resources. In some aspects, the transmitting the request comprises transmitting, by the BS to the first UE, at least one of a MAC-CE or DCI.

At block 740, the UE BS receives, from the first UE, the first SRS transmission from the one or more SRS ports within the plurality of SRS resources. In some instances, the BS may utilize one or more components, such as the processor 502, the memory 504, the SRS module 508, the transceiver 510, the modem 512, and the one or more antennas 516, to receive the first SRS transmission from the one or more SRS ports within the plurality of SRS resources.

In some aspects, a quantity of the one or more SRS ports is based at least in part on transmission rank information associated with the first UE. In some aspects, the BS may also select a subset of the plurality of SRS resources for the first UE based on a quantity of spatial layers indicated by the transmission rank information associated with the first UE, where the one or more SRS ports are associated with the subset of the plurality of SRS resources. In some aspects, the BS may also receive, from the first UE, an RI report indicating the quantity of spatial layers currently supported by the first UE.

In some aspects, a quantity of SRS resources in the plurality of SRS resources determined at block 710 is equal to or greater than a quantity of transmit antenna ports supported by the first UE. In some aspects, the BS may also receive, from the first UE, a UE capability report indicating the quantity of transmit antenna ports supported by the first UE. In some aspects, a quantity of the one or more SRS ports activated at block 730 is less than the quantity of transmit antenna ports supported by the first UE.

In some aspects, the BS may also transmit, to a second UE, a request to activate a plurality of SRS ports for a second SRS transmission. The BS may also receive, from the second UE, the second SRS transmission from a first subset of the plurality of SRS ports less than all of the plurality of SRS ports. In some aspects, the BS may also receive, from the second UE, a repetition of the second SRS transmission from a second subset of the plurality of SRS ports non-overlapping with the first subset of the plurality of SRS ports.

In some aspects, the BS may determine whether a rank indicator (RI) report is received from a second UE. The BS may also transmit, to the second UE in response to determining that no RI report is received from the second UE, a request to activate a plurality of SRS ports for a second SRS transmission based on a quantity of transmit antenna ports supported by the second UE. In some aspects, the determining whether a RI report is received from the second UE includes determining, by the BS, whether a gap duration between a last RI report received from the second UE and a transmission occasion for the second SRS transmission satisfies a threshold.

Figure 8:
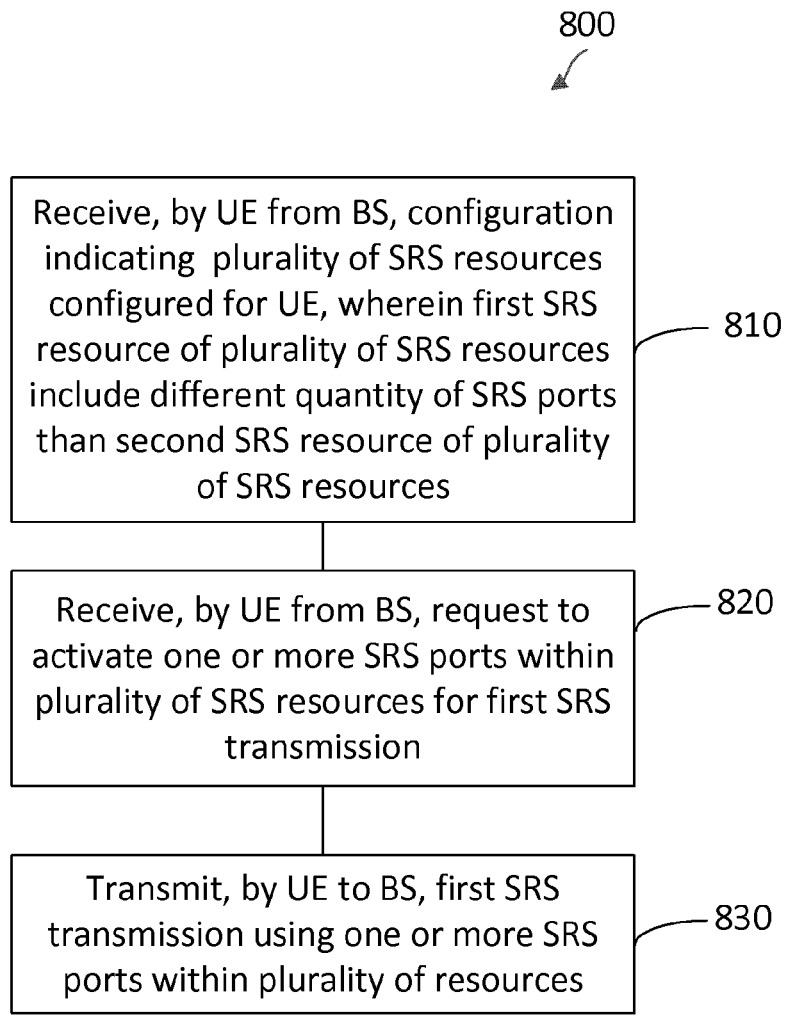
FIG. 8 is a flow diagram of a wireless communication method according to some aspects of the present disclosure.

FIG. 8 is a flow diagram of a wireless communication method 800 according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the UEs 115, 304, 500, and/or 604 may utilize one or more components, such as the processor 402, the memory 404, the SRS module 408, the transceiver 410, the modem 412, and the one or more antennas 416, to execute the steps of method 800. The method 800 may employ similar mechanisms as in the methods 300 and 600 discussed above with reference to FIGS. 3A and 6, respectively, and the schemes 380, 360, 680, and 660 discussed above with reference to FIGS. 3B, 3C, 6B, and 6C, respectively. As illustrated, the method 800 includes a number of enumerated steps, but aspects of the method 800 may include additional steps before, after, and in between the enumerated steps. In some aspects, one or more of the enumerated steps may be omitted or performed in a different order.

At block 810, a UE (e.g., the UEs 115, 304, 400, and/or 604) receives, from a BS (e.g., the BSs 105, 302, 500, and/or 602), a configuration indicating a plurality of SRS resources (e.g., the SRS resources 672) configured for the UE, where a first SRS resource of the plurality of SRS resources includes a different quantity of SRS ports (e.g., the SRS ports 674) than a second SRS resource of the plurality of SRS resources. In some instances, the BS may utilize one or more components, such as the processor 502, the memory 504, the SRS module 508, the transceiver 510, the modem 512, and the one or more antennas 516, to receive a configuration indicating the plurality of SRS resources configured for the UE At block 820, the UE receives, from the BS, a request to activate one or more SRS ports within the plurality of SRS resources for a first SRS transmission. In some instances, the BS may utilize one or more components, such as the processor 502, the memory 504, the SRS module 508, the transceiver 510, the modem 512, and the one or more antennas 516, to receive the request to activate the one or more SRS ports within the plurality of SRS resources for the first SRS transmission In some aspects, the one or more SRS ports are associated with one or more SRS resources of the plurality of SRS resources. In some aspects, the receiving the request may include receiving, from the BS, at least one of a MAC-CE or DCI.

At block 830, the UE transmits, to the BS, the first SRS transmission using the one or more SRS ports within the configured plurality of SRS resources. In some instances, the BS may utilize one or more components, such as the processor 502, the memory 504, the SRS module 508, the transceiver 510, the modem 512, and the one or more antennas 516, transmit the first SRS transmission using the one or more SRS ports within the configured plurality of SRS resources.

In some aspects, a quantity of the one or more SRS ports is based at least in part on transmission rank information associated with the UE. In some aspects, the UE may also transmit, to the BS, an RI report including the transmission rank information.

In some aspects, a quantity of SRS resources in the plurality of SRS resources is equal to or greater than a quantity of transmit antenna ports supported by the UE. In some aspects, the UE may also transmit, to the BS, a UE capability report indicating the quantity of transmit antenna ports supported by the UE. In some aspects, a quantity of the one or more SRS ports is less than the quantity of transmit antenna ports supported by the UE.

In some aspects, the UE may also receive, from the BS, a further request to activate a plurality of SRS ports within the plurality of SRS resources for a second SRS transmission, where a quantity of the plurality of SRS ports is greater than a quantity of spatial layers currently supported by the UE. The UE may also transmit, to the BS, the second SRS transmission using a first subset of the plurality of SRS ports, where a quantity of SRS ports in the first subset of the plurality of SRS ports corresponds to the quantity of spatial layers currently supported by the UE. In some aspects, the UE may also transmit, to the BS, a repetition of the second SRS transmission using a second subset of the plurality of SRS ports non-overlapping with the first subset of the plurality of SRS ports. In some aspects, the UE may also refrain from transmitting a SRS in remaining SRS ports of the plurality of SRS ports.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   determining, by a base station (BS), a plurality of sounding reference signal (SRS) resources for at least a first user equipment (UE), wherein a first SRS resource of the plurality of SRS resources includes a different quantity of SRS ports than a second SRS resource of the plurality of SRS resources;
   transmitting, by the BS to the first UE, a configuration indicating the plurality of SRS resources; and
   transmitting, by the BS to the first UE, a further request to activate a plurality of SRS ports within the plurality of SRS resources for a second SRS transmission, wherein a quantity of the plurality of SRS ports is greater than a quantity of spatial layers currently supported by the first UE.

2. The method of claim 1, further comprising:
   transmitting, by the BS to the first UE, a request to activate one or more SRS ports within the plurality of SRS resources for a first SRS transmission; and
   receiving, by the BS from the first UE, the first SRS transmission from the one or more SRS ports within the plurality of SRS resources.

3. The method of claim 1, wherein a quantity of the one or more SRS ports is based at least in part on transmission rank information associated with the first UE.

4. The method of claim 1, wherein a quantity of SRS resources in the plurality of SRS resources is equal to or greater than a quantity of transmit antenna ports supported by the first UE.

5. The method of claim 4, further comprising:
   receiving, by the BS from the first UE, a UE capability report indicating the quantity of transmit antenna ports supported by the first UE.

6. A method of wireless communication, comprising:
   receiving, by a user equipment (UE), a configuration indicating a plurality of sounding reference signal (SRS) resources configured for the UE, wherein a first SRS resource of the plurality of SRS resources includes a different quantity of SRS ports than a second SRS resource of the plurality of SRS resources;
   receiving, by the UE, a further request to activate a plurality of SRS ports within the plurality of SRS resources for a second SRS transmission, wherein a quantity of the plurality of SRS ports is greater than a quantity of spatial layers currently supported by the UE; and
   transmitting, by the UE, a first SRS transmission using one or more SRS ports within the configured plurality of SRS resources.

7. The method of claim 6, further comprising:
   receiving, by the UE, a request to activate the one or more SRS ports within the plurality of SRS resources for the first SRS transmission.

8. The method of claim 6, wherein a quantity of the one or more SRS ports is based at least in part on transmission rank information associated with the UE.

9. The method of claim 8, further comprising:
   transmitting, by the UE, a rank indicator (RI) report including the transmission rank information.

10. The method of claim 6, wherein a quantity of SRS resources in the plurality of SRS resources is equal to or greater than a quantity of transmit antenna ports supported by the UE.

11. The method of claim 10, further comprising:
    transmitting, by the UE, a UE capability report indicating the quantity of transmit antenna ports supported by the UE.

12. The method of claim 10, wherein a quantity of the one or more SRS ports is less than the quantity of transmit antenna ports supported by the UE.

13. The method of claim 6, wherein the one or more SRS ports are associated with one or more SRS resources of the plurality of SRS resources.

14. The method of claim 6, further comprising:
    transmitting, by the UE, the second SRS transmission using a first subset of the plurality of SRS ports, wherein a quantity of SRS ports in the first subset of the plurality of SRS ports corresponds to the quantity of spatial layers currently supported by the UE.

15. The method of claim 14, further comprising:
transmitting, by the UE, a repetition of the second SRS transmission using a second subset of the plurality of SRS ports non-overlapping with the first subset of the plurality of SRS ports.

16. The method of claim 15, further comprising:
refraining, by the UE, from transmitting a SRS in remaining SRS ports of the plurality of SRS ports.

17. The method of claim 6, wherein the receiving the request comprises:
receiving, by the UE, at least one of a medium access control-control element (MAC-CE) or downlink control information (DCI).

18. A base station (BS) comprising:
a processor configured to determine a plurality of sounding reference signal (SRS) resources for at least a first user equipment (UE), wherein a first SRS resource of the plurality of SRS resources includes a different quantity of SRS ports than a second SRS resource of the plurality of SRS resources; and
a transceiver configured to transmit, to the first UE, a configuration indicating the plurality of SRS resources, and a further request to activate a plurality of SRS ports within the plurality of SRS resources for a second SRS transmission, wherein a quantity of the plurality of SRS ports is greater than a quantity of spatial layers currently supported by the first UE.

19. The BS of claim 18, wherein the transceiver is further configured to:
transmit, to the first UE, a request to activate one or more SRS ports within the plurality of SRS resources for a first SRS transmission; and
receive, from the first UE, the first SRS transmission from the one or more SRS ports within the plurality of SRS resources.

20. The BS of claim 18, wherein a quantity of the one or more SRS ports is based at least in part on transmission rank information associated with the first UE.

21. The BS of claim 18, wherein a quantity of SRS resources in the plurality of SRS resources is equal to or greater than a quantity of transmit antenna ports supported by the first UE.

22. The BS of claim 21, wherein the transceiver is further configured to:
receive, from the first UE, a UE capability report indicating the quantity of transmit antenna ports supported by the first UE.

23. A user equipment (UE) comprising:
a transceiver configured to:
receive a configuration indicating a plurality of sounding reference signal (SRS) resources configured for the UE, wherein a first SRS resource of the plurality of SRS resources includes a different quantity of SRS ports than a second SRS resource of the plurality of SRS resources;

receive a further request to activate a plurality of SRS ports within the plurality of SRS resources for a second SRS transmission, wherein a quantity of the plurality of SRS ports is greater than a quantity of spatial layers currently supported by the UE; and
transmit a first SRS transmission using one or more SRS ports within the configured plurality of SRS resources.

24. The UE of claim 23, wherein the transceiver is further configured to:
receive a request to activate the one or more SRS ports within the plurality of SRS resources for the first SRS transmission.

25. The UE of claim 23, wherein a quantity of the one or more SRS ports is based at least in part on transmission rank information associated with the UE.

26. The UE of claim 25, wherein the transceiver is further configured to:
transmit a rank indicator (RI) report including the transmission rank information.

27. The UE of claim 23, wherein a quantity of SRS resources in the plurality of SRS resources is equal to or greater than a quantity of transmit antenna ports supported by the UE.

28. The UE of claim 27, wherein the transceiver is further configured to:
transmit a UE capability report indicating the quantity of transmit antenna ports supported by the UE.

29. The UE of claim 27, wherein a quantity of the one or more SRS ports is less than the quantity of transmit antenna ports supported by the UE.

30. The UE of claim 23, wherein the one or more SRS ports are associated with one or more SRS resources of the plurality of SRS resources.

31. The UE of claim 23, wherein the transceiver is further configured to:
transmit the second SRS transmission using a first subset of the plurality of SRS ports, wherein a quantity of SRS ports in the first subset of the plurality of SRS ports corresponds to the quantity of spatial layers currently supported by the UE.

32. The UE of claim 31, wherein the transceiver is further configured to:
transmit a repetition of the second SRS transmission using a second subset of the plurality of SRS ports non-overlapping with the first subset of the plurality of SRS ports.

33. The UE of claim 32, further comprising:
a processor configured to refrain from transmit a SRS in remaining SRS ports of the plurality of SRS ports.

34. The UE of claim 23, wherein the transceiver configured to receive the request is further configured to:
receive at least one of a medium access control-control element (MAC-CE) or downlink control information (DCI).

* * * * *